(12) United States Patent
Ben Henda et al.

(10) Patent No.: US 11,617,082 B2
(45) Date of Patent: *Mar. 28, 2023

(54) METHODS PROVIDING NAS CONNECTION IDENTIFICATIONS AND RELATED WIRELESS TERMINALS AND NETWORK NODES

(71) Applicant: Telefonaktiebolaget LM Ericsson (publ), Stockholm (SE)

(72) Inventors: Noamen Ben Henda, Stockholm (SE); Mikael Wass, Sätila (SE); Monica Wifvesson, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/830,253

(22) Filed: Jun. 1, 2022

(65) Prior Publication Data
US 2022/0295284 A1    Sep. 15, 2022

Related U.S. Application Data

(63) Continuation of application No. 16/633,437, filed as application No. PCT/EP2017/068622 on Jul. 24, 2017, now Pat. No. 11,356,850.

(51) Int. Cl.
*H04L 12/26* (2006.01)
*H04W 12/106* (2021.01)
(Continued)

(52) U.S. Cl.
CPC ....... *H04W 12/106* (2021.01); *H04L 63/0457* (2013.01); *H04W 12/02* (2013.01);
(Continued)

(58) Field of Classification Search
None
See application file for complete search history.

(56) References Cited

U.S. PATENT DOCUMENTS

| | | | |
|---|---|---|---|
| 2018/0132293 A1* | 5/2018 | Escott | H04W 12/106 |
| 2019/0045574 A1* | 2/2019 | Feng | H04B 7/155 |
| 2020/0008167 A1* | 1/2020 | Venkataraman | H04W 36/0022 |

OTHER PUBLICATIONS

International Search Report and Written Opinion dated Mar. 12, 2018 issued in International Application No. PCT/EP2017/068622. (15 pages).

(Continued)

*Primary Examiner* — Zewdu A Beyen
(74) *Attorney, Agent, or Firm* — Rothwell, Figg, Ersnst & Manbeck, P.C.

(57) ABSTRACT

A method at a UE may include providing a first NAS connection with a network node through a first access node, wherein a first NAS CID is associated with the first NAS connection. While providing the first NAS connection, a second NAS CID may be allocated for a second NAS connection with the network node through a second access node. A registration request message may be transmitted to the network node to request the second NAS connection, wherein transmitting the registration request message includes performing integrity protection for the registration request message using the second NAS CID. A security mode command message may be received from the network node, wherein the security mode command message corresponds to the registration request message. Responsive to receiving the security mode command message, a security mode complete message may be transmitted to the network node through the second access node.

20 Claims, 14 Drawing Sheets

(51) Int. Cl.
  *H04W 76/11* (2018.01)
  *H04L 9/40* (2022.01)
  *H04W 12/02* (2009.01)
  *H04W 12/04* (2021.01)
  *H04W 60/02* (2009.01)
  *H04W 12/037* (2021.01)

(52) U.S. Cl.
  CPC ......... *H04W 12/037* (2021.01); *H04W 12/04* (2013.01); *H04W 60/02* (2013.01); *H04W 76/11* (2018.02)

(56) References Cited

OTHER PUBLICATIONS

Ericsson, "Discussion on security for multiple NAS connections (KI #1.7)", 3GPP TSG SA WG3 (Security) Meeting #87; S3-171274; May 15-19, 2017; Ljubljana, Slovenia. (4 pages).

Ericsson, "New solution for the protection of multiple NAS connections (KI #1.7)", 3GPP TSG SA WG3 (Security) Meeting #87; S3-171275; May 15-19, 2017, Ljubljana, Slovenia. (2 pages).

3GPP TR 33.899 V1.2.0 (Jun. 2017); 3rd Generation Partnership Project; Technical Specification Group Services and System Aspects; Study on the security aspects of the next generation system (Release 14). (586 pages).

3GPP TS 23.501 V1.1.0 (Jul. 2017); 3rd Generation Partnership Project; Technical Specification Group Services and System Aspects; System Architecture for the 5G System; Stage 2 (Release 15). (165 pages).

3GPP TS 33.401 V15.0.0 (Jun. 2017); 3rd Generation Partnership Project; Technical Specification Group Services and System Aspects; 3GPP System Architecture Evolution (SAE); Security architecture (Release 15). (153 pages).

3GPP TS 23.502 V0.4.0 (May 2017), 3rd Generation Partnership Project; Technical Specification Group Services and System Aspects; Procedures for the 5G System; Stage 2 (Release 15) May 2017 (126 pages).

* cited by examiner

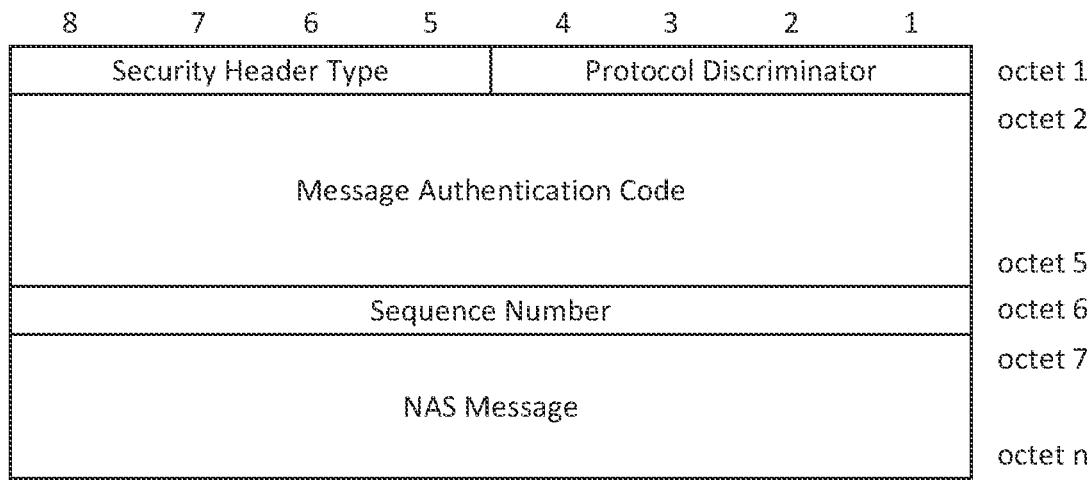

Figure 14
| Process Distinguisher | Value |
|---|---|
| NAS-enc-alg | 0x01 |
| NAS-int-alg | 0x02 |
Figure 15
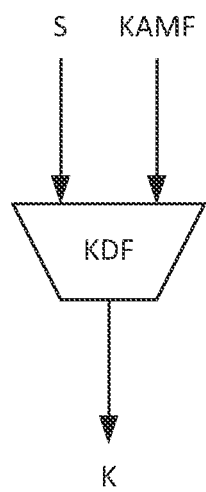
Figure 16
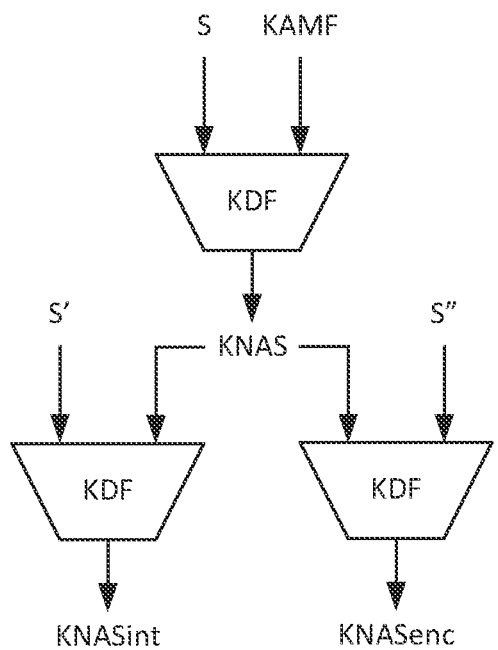

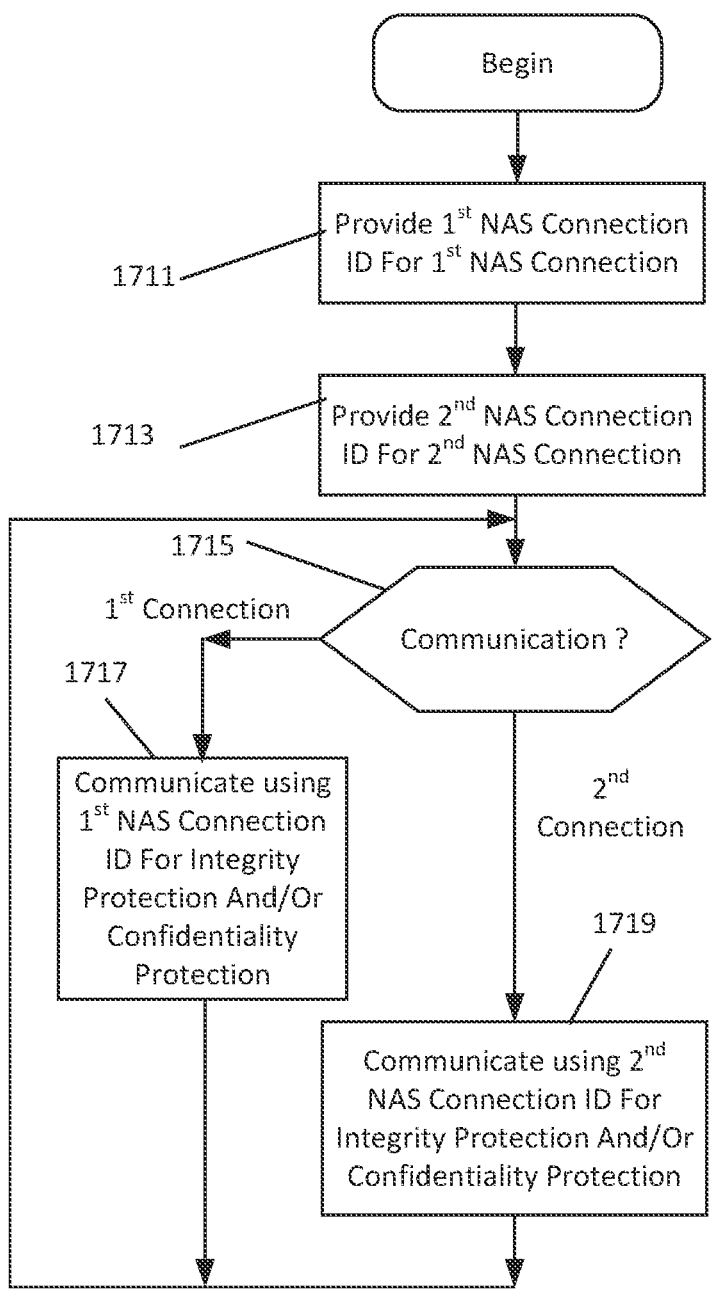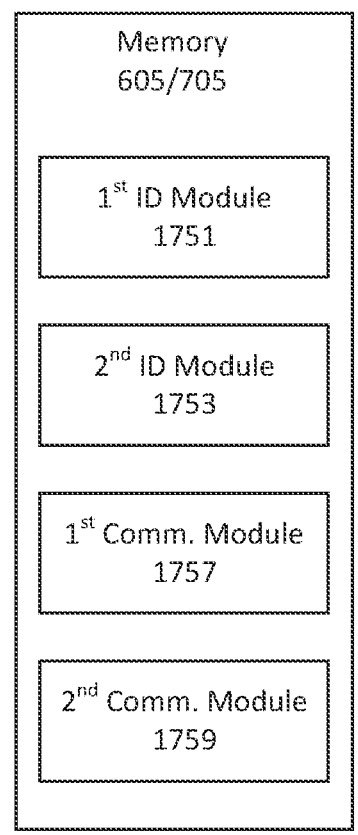

METHODS PROVIDING NAS CONNECTION IDENTIFICATIONS AND RELATED WIRELESS TERMINALS AND NETWORK NODES

CROSS REFERENCE TO RELATED APPLICATIONS

This application is a continuation of U.S. patent application Ser. No. 16/633,437, filed on Jan. 23, 2020 (status: pending), which is the U.S. National Stage of International Patent Application No. PCT/EP2017/068622, filed Jul. 24, 2017. The above identified applications are incorporated by this reference.

TECHNICAL FIELD

The present disclosure relates generally to the field of communications, and more particularly to wireless communications and related network nodes and wireless terminals.

BACKGROUND

In 5G Systems, a wireless terminal UE may be registered simultaneously to the same Public Land Mobile Network PLMN over a 3GPP access (e.g., using an LTE or 5G access node, also referred to as a base station, eNB, gNB, etc.) and a non-3GPP access (e.g., using a WiFi or satellite node). For this purpose, it is expected that the wireless terminal UE and the network Access Management Function (AMF) maintain one Non-Access Stratum (NAS) connection for each access type (i.e., one NAS connection for the 3GPP access and one NAS connection for the non-3GPP NAS connection). In such scenarios, TS 23.501 (also referred to as reference [1]) further describes which elements of the user context in the AMF would be shared among the NAS connections and which would not. For example, there may be multiple Connection Management (CM) and Registration Management (RM) states, one state machine per access type. On the other hand, a common temporary UE identifier may be used (i.e., a same temporary UE identifier may be used for each access type).

As described in TS 33.401 (also referred to as reference [2]), security mechanisms in legacy systems may provide integrity, confidentiality, and replay protection for NAS messages. The NAS security context may include the KASME key, the derived protection keys KNASint and KNASenc, the key set identifier eKSI, and a pair of counter NAS COUNT values, one for each direction (uplink and downlink). These security parameters may be exclusive to one NAS connection and may be refreshed upon the creation of a new KASME (e.g., following an authentication procedure).

Furthermore, a replay protection mechanism, partly realized by the NAS COUNT values, may rely on assumptions that the protocol is reliable and that NAS procedures are run sequentially such that a new procedure is only started after the termination of the current procedure. This may provide/guarantee in-order delivery of the NAS messages so that both the UE and the Mobility Management Entity MME need only store two values for NAS COUNT values, one per direction (i.e., one NAS COUNT for uplink and one NAS COUNT for downlink). These would provide the NAS COUNT value to use in the next NAS message to send, and the NAS COUNT value of the last successfully received NAS message.

With multiple connections via 3GPP and non-3GPP accesses, in-order deliver of NAS messages via the different connections may be unreliable.

SUMMARY

According to some embodiments of inventive concepts, a method may be provided at a wireless terminal to support communication with a network node of a wireless communication network. The method may include providing a first Non-Access Stratum (NAS) connection between the wireless terminal and the network node through a first access node, wherein a first NAS Connection IDentification (NAS CID) is associated with the first NAS connection. While providing the first NAS connection, a second NAS CID may be allocated for a second NAS connection between the wireless terminal and the network node through a second access node, wherein the first NAS CID and the second NAS CID are different. A registration request message may be transmitted through the second access node to the network node to request the second NAS connection, wherein transmitting the registration request message includes performing integrity protection for the registration request message using the second NAS CID. A security mode command message may be received from the network node through the second access node, wherein the security mode command message corresponds to the registration request message. Responsive to receiving the security mode command message, a security mode complete message may be transmitted from the wireless terminal to the network node through the second access node.

According to some other embodiments of inventive concepts, a method at a network node of a wireless communication network may provide communication of Non-Access Stratum (NAS) messages with a wireless terminal. The method may include providing a first Non-Access Stratum (NAS) connection between the network node and the wireless terminal through a first access node, wherein a first NAS Connection IDentification (NAS CID) is associated with the first NAS connection. While providing the first NAS connection, a registration request message may be received through a second access node from the wireless terminal to request a second NAS connection through the second access node. Responsive to receiving the registration request message, a security mode command message may be transmitted to the wireless terminal through the second access node, wherein transmitting the security mode command message includes performing integrity protection for the security mode command message using a second NAS CID, and wherein the first NAS CID and the second NAS CID are different. A security mode complete message may be received from the wireless terminal through the second access node, wherein the security mode complete message corresponds to the security mode command message.

According to still other embodiments of inventive concepts, a wireless terminal may support communication with a network node of a wireless communication network. The wireless terminal may include a transceiver configured to provide wireless communication over a radio interface, and a processor coupled to the transceiver. The processor may be configured to provide a first Non-Access Stratum (NAS) connection between the wireless terminal and the network node through a first access node, wherein a first NAS Connection IDentification (NAS CID) is associated with the first NAS connection. The processor may also be configured to allocate a second NAS CID for a second NAS connection between the wireless terminal and the network node through a second access node while providing the first NAS connection, wherein the first NAS CID and the second NAS CID are different. The processor may be further configured to transmit a registration request message through the second access node to the network node to request the second NAS connection, wherein transmitting the registration request message includes performing integrity protection for the registration request message using the second NAS CID. The processor may be further configured to receive a security mode command message from the network node through the second access node, wherein the security mode command message corresponds to the registration request message. The processor may be further configured to transmit a security mode complete message from the wireless terminal to the network node through the second access node responsive to receiving the security mode command message.

According to yet other embodiments of inventive concepts, a wireless terminal may support communication with a network node of a wireless communication network. The wireless terminal may be adapted to provide a first Non-Access Stratum (NAS) connection between the wireless terminal and the network node through a first access node, wherein a first NAS Connection IDentification (NAS CID) is associated with the first NAS connection. The wireless terminal may also be adapted to allocate a second NAS CID for a second NAS connection between the wireless terminal and the network node through a second access node while providing the first NAS connection, wherein the first NAS CID and the second NAS CID are different. The wireless terminal may be further adapted to transmit a registration request message through the second access node to the network node to request the second NAS connection, wherein transmitting the registration request message includes performing integrity protection for the registration request message using the second NAS CID. The wireless terminal may be further adapted to receive a security mode command message from the network node through the second access node, wherein the security mode command message corresponds to the registration request message. The wireless terminal may be further adapted to transmit a security mode complete message from the wireless terminal to the network node through the second access node responsive to receiving the security mode command message.

According to more embodiments of inventive concepts, a network node of a wireless communication network may provide communication of Non-Access Stratum (NAS) messages with a wireless terminal. The network node may include a network interface configured to provide network communication with other nodes of the wireless communication network, and a processor coupled to the network interface. The processor may be configured to provide a first Non-Access Stratum (NAS) connection between the network node and the wireless terminal through a first access node, wherein a first NAS Connection IDentification (NAS CID) is associated with the first NAS connection. The processor may also be configured to receive a registration request message through a second access node from the wireless terminal to request a second NAS connection through the second access node while providing the first NAS connection. The processor may be further configured to transmit a security mode command message to the wireless terminal through the second access node responsive to receiving the registration request message, wherein transmitting the security mode command message includes performing integrity protection for the security mode command message using a second NAS CID, and wherein the first NAS CID and the second NAS CID are different. The processor may be further configured to receive a security mode complete message from the wireless terminal through the second access node, wherein the security mode complete message corresponds to the security mode command message.

According to still more embodiments of inventive concepts, a network node of a wireless communication network may provide communication of Non-Access Stratum (NAS) messages with a wireless terminal. The network node may be adapted to provide a first Non-Access Stratum (NAS) connection between the network node and the wireless terminal through a first access node, wherein a first NAS Connection IDentification (NAS CID) is associated with the first NAS connection. The network node may also be adapted to receive a registration request message through a second access node from the wireless terminal to request a second NAS connection through the second access node while providing the first NAS connection. The network node may be further adapted to transmit a security mode command message to the wireless terminal through the second access node responsive to receiving the registration request message, wherein transmitting the security mode command message includes performing integrity protection for the security mode command message using a second NAS CID, and wherein the first NAS CID and the second NAS CID are different. The network node may be further adapted to receive a security mode complete message from the wireless terminal through the second access node, wherein the security mode complete message corresponds to the security mode command message.

According to further embodiments of inventive concepts, a computer program product may include a computer readable storage medium having computer readable program code embodied in the computer readable storage medium. When executed by a processor of a wireless terminal, the computer readable program code may cause the wireless terminal to provide a first Non-Access Stratum (NAS) connection between the wireless terminal and the network node through a first access node, wherein a first NAS Connection Identification (NAS CID) is associated with the first NAS connection. While providing the first NAS connection, the computer readable program code may also cause the wireless terminal to allocate a second NAS CID for a second NAS connection between the wireless terminal and the network node through a second access node, wherein the first NAS CID and the second NAS CID are different. The computer readable program code may further cause the wireless terminal to transmit a registration request message through the second access node to the network node to request the second NAS connection, wherein transmitting the registration request message includes performing integrity protection for the registration request message using the second NAS CID. The computer readable program code may further cause the wireless terminal to receive a security mode command message from the network node through the second access node, wherein the security mode command message corresponds to the registration request message. The computer readable program code may further cause the wireless terminal to transmit a security mode complete message from the wireless terminal to the network node through the second access node responsive to receiving the security mode command message.

According to still further embodiments of inventive concepts, a computer program product may include a computer readable storage medium having computer readable program code embodied in the computer readable storage medium. When executed by a processor of a network node, the computer readable program code may cause the network node to provide a first Non-Access Stratum (NAS) connection between the network node and the wireless terminal through a first access node, wherein a first NAS Connection Identification (NAS CID) is associated with the first NAS connection. While providing the first NAS connection, the computer readable program code may cause the network node to receive a registration request message through a second access node from the wireless terminal to request a second NAS connection through the second access node. Responsive to receiving the registration request message, the computer readable program code may cause the network node to transmit a security mode command message to the wireless terminal through the second access node, wherein transmitting the security mode command message includes performing integrity protection for the security mode command message using a second NAS CID, and wherein the first NAS CID and the second NAS CID are different. The computer readable program code may cause the network node to receive a security mode complete message from the wireless terminal through the second access node, wherein the security mode complete message corresponds to the security mode command message.

According to some embodiments of inventive concepts disclosed herein, management of parallel NAS connections may be improved.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating an example of message organization for a security protected NAS message;

FIG. 2 is a table illustrating security header types of the security protected NAS message of FIG. 1;

FIG. 14 illustrates process type distinguishers that may be used according to some embodiments of inventive concepts;

FIGS. 15 and 16 illustrate key derivations that may be used according to some embodiments of inventive concepts;

FIG. 17A is a flow chart illustrating operations of communicating NAS messages over multiple NAS connections according to some embodiments of inventive concepts;

FIG. 17B is a block diagram illustrating memory modules corresponding to operations of FIG. 17A according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 5:
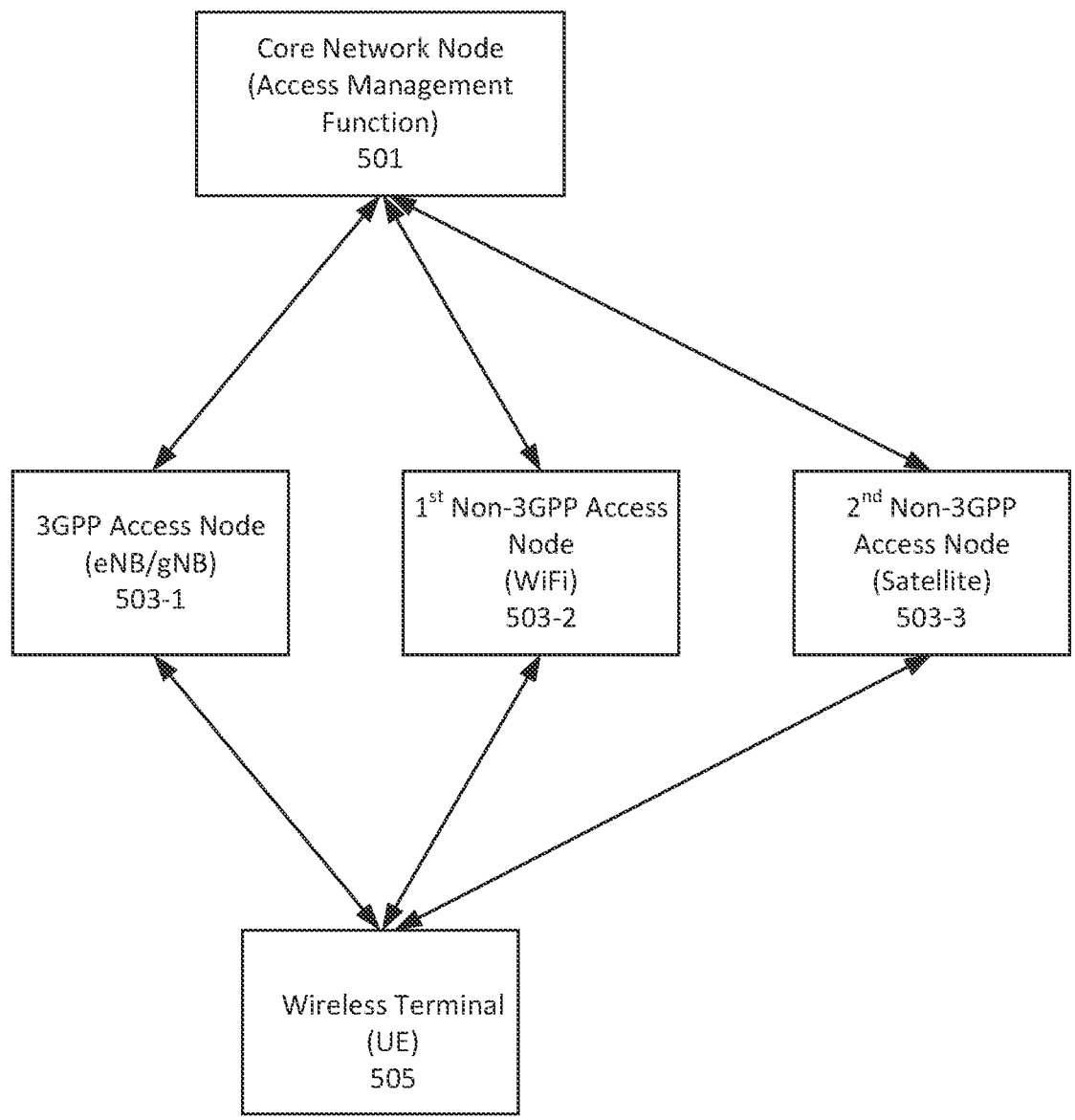
FIG. 5 is a block diagram illustrating multiple NAS connections between a core network node and a wireless terminal according to some embodiments of inventive concepts.

FIG. 5 is a block diagram illustrating multiple NAS connections between core network node 501 (providing access management) and a wireless terminal UE 505 according to some embodiments of inventive concepts. As shown, a first NAS connection may be provided through a 3GPP access node (e.g., a base station, eNB, eNodeB, gNB, gNodeB), a second NAS connection may be provided through a first non-3GPP access node (e.g., a WiFi access node), and a third NAS connection may be provided through a second non-3GPP access node (e.g., a satellite node). With different NAS connections provided through different access nodes of different technologies, a likelihood that the receiving node (either the wireless terminal 505 in the downlink or the core network node 501 in the uplink) receives all NAS messages in order may be reduced.

Figure 6:
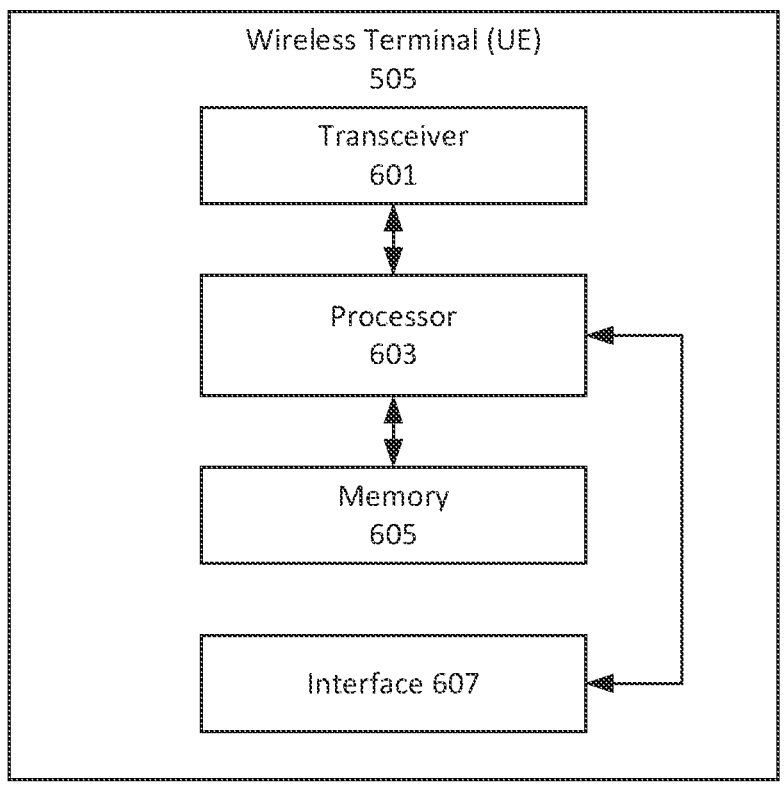
FIG. 6 is a block diagram illustrating elements of a wireless terminal UE according to some embodiments of inventive concepts.

FIG. 6 is a block diagram illustrating elements of a wireless terminal UE 505 (also referred to as a wireless device, a wireless communication device, a wireless communication terminal, user equipment, a user equipment node/terminal/device, etc.) configured to provide wireless communication according to embodiments of inventive concepts. As shown, wireless terminal UE may include a transceiver circuit 601 (also referred to as a transceiver) including a transmitter and a receiver configured to provide uplink and downlink radio communications with a base station(s) of a radio access network. Wireless terminal UE may also include a processor circuit 603 (also referred to as a processor) coupled to the transceiver circuit, and a memory circuit 605 (also referred to as memory) coupled to the processor circuit. The memory circuit 605 may include computer readable program code that when executed by the processor circuit 603 causes the processor circuit to perform operations according to embodiments disclosed herein. According to other embodiments, processor circuit 603 may be defined to include memory so that a separate memory circuit is not required. Wireless terminal UE may also include an interface 607 (such as a user interface) coupled with processor 603, and/or wireless terminal UE may be incorporated in a vehicle. User interface 607 may include, for example, a display (e.g., a touch screen) that provides visual output, a speaker that provides audio output, and/or a user input device (e.g., a touchscreen, keypad, button(s), etc.) that accepts user input.

As discussed herein, operations of wireless terminal UE 505 may be performed by processor 603 and/or transceiver 601. For example, processor 603 may control transceiver 601 to transmit communications through transceiver 601 over a radio interface to an access node and/or to receive communications through transceiver 601 from an access node over a radio interface. Moreover, modules may be stored in memory 605, and these modules may provide instructions so that when instructions of a module are executed by processor 603, processor 603 performs respective operations (e.g., operations discussed below with respect to Example Embodiments).

Figure 7:
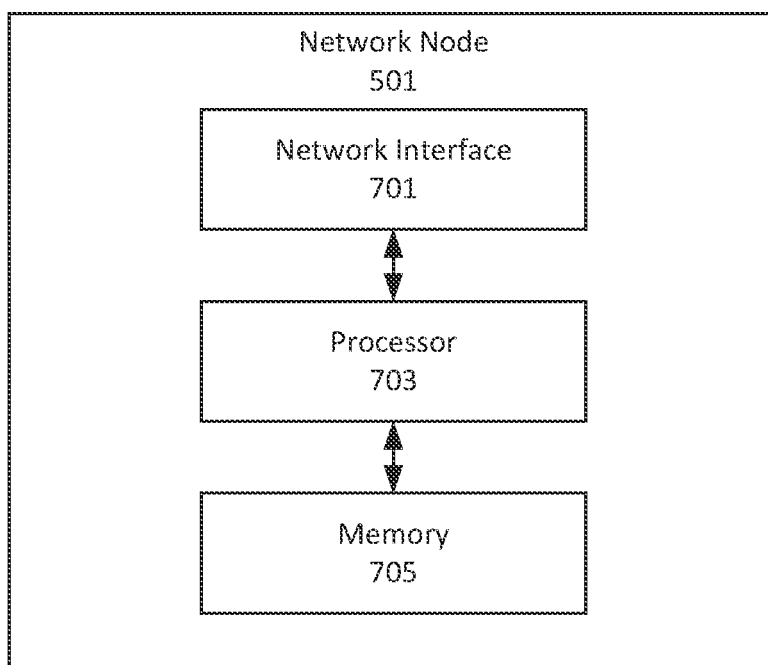
FIG. 7 is a block diagram illustrating elements of a network node according to some embodiments of inventive concepts.

FIG. 7 is a block diagram illustrating elements of a network node (also referred to as a core network node, base station, eNB, eNodeB, gNB, gNodeB, etc.) of a Radio Access Network (RAN) configured to support wireless communication according to embodiments of inventive concepts. As shown, the network node may include a network interface circuit 501 (also referred to as a network interface) including a transmitter and a receiver configured to provide uplink and downlink radio communications with wireless terminals, for example, through access nodes as shown in FIG. 5. The network node may also include a processor circuit 703 (also referred to as a processor) coupled to the network interface circuit, and a memory circuit 705 (also referred to as memory) coupled to the processor circuit. The memory circuit 705 may include computer readable program code that when executed by the processor circuit 703 causes the processor circuit to perform operations according to embodiments disclosed herein. According to other embodiments, processor circuit 703 may be defined to include memory so that a separate memory circuit is not required.

As discussed herein, operations of the network node 501 may be performed by processor 703 and/or network interface 701. For example, processor 703 may control network interface 701 to transmit communications through network interface 701 to one or more access nodes and/or to receive communications through network interface from one or more access nodes as shown in FIG. 5. Moreover, modules may be stored in memory 705, and these modules may provide instructions so that when instructions of a module are executed by processor 703, processor 703 performs respective operations. While not shown in FIGS. 5 and 7, operations of 3GPP access node 503-1 and network node 501 may be combined by providing a transceiver in network node 501. In such embodiments, the transceiver of network node 501 may provide the 3GPP NAS connection via a direct 3GPP interface with wireless terminal 505. According to such embodiments, processor 703 may control the transceiver to transmit communication through the transceiver over a radio interface to wireless terminal 505 and/or to receive communications through the transceiver from wireless terminal 505.

A general message format and the information element coding for the NAS messages in EPC will now be discussed.

For legacy EPC/LTE systems, TS 24.301 (also referred to as reference [3]) describes a general message format and information element coding for NAS messages. If the NAS message is a security protected NAS message, then the message includes the following parts: a) protocol discriminator; b) security header type; c) message authentication code (MAC); d) sequence number; and e) plain NAS message. The organization of a security protected NAS message is illustrated in the example shown in FIG. 1 which illustrates a message organization for a security protected NAS message.

Bits 5 to 8 of the first octet of every EPS Mobility Management (EMM) message contain the Security header type IE. This IE includes control information related to the security protection of a NAS message. The total size of the Security header type IE is 4 bits. The Security header type IE can take the values shown in the table of FIG. 2 which illustrates security header types of the security protected NAS message of FIG. 1.

The Message Authentication Code (MAC) information element in FIG. 1 includes/contains the integrity protection information for the message. The MAC IE is included in the security protected NAS message if a valid EPS security context exists and security functions are started.

The Sequence number IE in FIG. 1 includes the NAS message sequence number (SN) which consists of the eight least significant bits of the NAS COUNT for a security protected NAS message.

When a NAS message is to be sent both ciphered and integrity protected, the NAS message is first ciphered and then the ciphered NAS message and the NAS sequence number (NAS COUNT) are integrity protected by calculating the MAC.

When a NAS message is to be sent with only integrity protection and unciphered, the unciphered NAS message and the NAS sequence number are integrity protected by calculating the MAC.

TS 33.401 (also referred to as reference [2]) and TS 24.301 (also referred to as reference [3]) describe that each separate KASME has a distinct pair of NAS COUNTs, one NAS COUNT for uplink and one NAS COUNT for downlink, associated with it.

The NAS COUNTs for a particular KASME are not reset to the start values (that is the NAS COUNTs only have their start value when a new KASME is created). This reduces/prevents a security issue of using the same NAS COUNTs with the same NAS keys, e.g. key stream re-use.

TS 24.301 (also referred to as reference [3]) describes that the sender uses its locally stored NAS COUNT as input to the integrity protection/verification process (also referred to as an integrity protection/verification algorithm) that is used to provide integrity and verification. The receiver uses the NAS sequence number included in the received message (or estimated from the 5 bits of the NAS sequence number received in the message) and an estimate for the NAS overflow counter to form the NAS COUNT input to the integrity verification process.

The integrity protection includes octets 6 to n of the security protected NAS message, i.e. the sequence number IE and the NAS message IE. After successful integrity protection validation, the receiver updates its corresponding locally stored NAS COUNT with the value of the estimated NAS COUNT for this NAS message.

Replay protection should/must assure that one and the same NAS message is not accepted twice by the receiver. Specifically, for a given EPS security context, a given NAS COUNT value shall be accepted at most one time and only if message integrity verifies correctly.

Figure 3B:
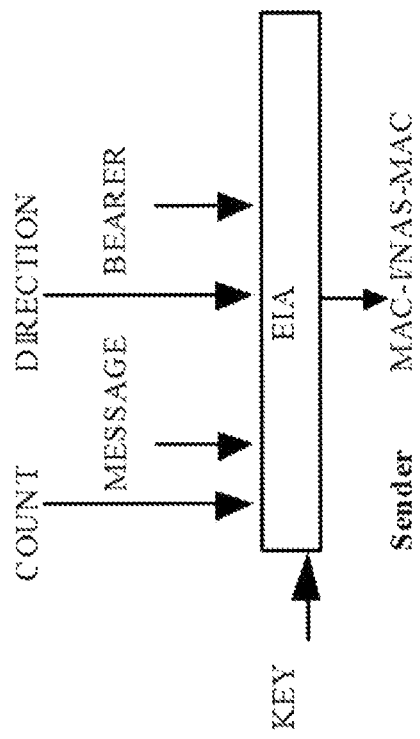
FIG. 3B illustrates security derivation of xMAC-I/xNAS-MAC by a receiver using a 128-bit integrity EIA process to authenticate the integrity of messages.
Figure 3A:
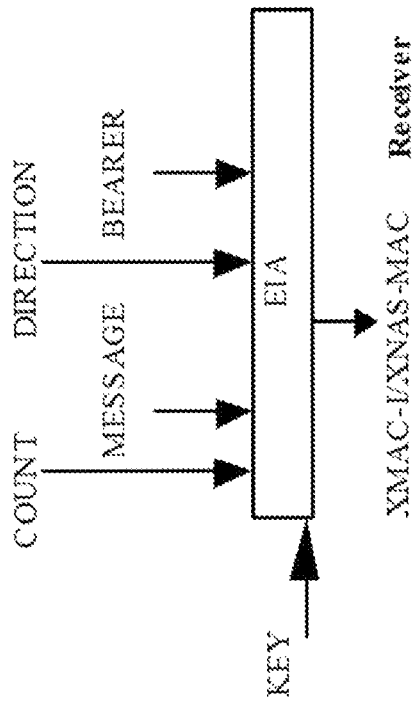
FIG. 3A illustrates security derivation of MAC-I/NAS-MAC by a transmitter using a 128-bit integrity EIA process to authenticate integrity of messages.

A 128-bit integrity process may be used in EPC/LTE. According to TS 33.401 (also referred to as reference [2]), the input parameters to the 128-bit integrity process are a 128-bit integrity key named KEY, a 32-bit COUNT (i.e. NAS COUNT), a 5-bit bearer identity called BEARER, the 1-bit direction of the transmission (i.e., DIRECTION), and the message itself (i.e., MESSAGE). The DIRECTION bit may/shall be 0 for uplink and 1 for downlink. The bit length of the MESSAGE is LENGTH. FIGS. 3A and 3B illustrate use of the 128-bit integrity process EIA to authenticate the integrity of messages. As shown in FIG. 3A, the sender may derive MAC-I/NAS-MAC, and as shown in FIG. 3B, the receiver may derive XMAC-I/XNAS-MAC.

Based on these input parameters the sender computes a 32-bit message authentication code (MAC-I/NAS-MAC) using the integrity process EIA (also referred to as the integrity algorithm EIA) of FIG. 3A. The message authentication code (MAC) is then appended to the message when sent as shown in FIG. 1. The receiver computes the expected message authentication code (XMAC-I/XNAS-MAC) on the message received (using the integrity process EIA of FIG. 3B, also referred to as an integrity algorithm) in the same way as the sender computed its message authentication code on the message sent and verifies the data integrity of the message by comparing the computed MAC to the received message authentication code, i.e. MAC-I/NAS-MAC.

TS 24.301 (also referred to as reference [3]) describes that the sender uses its locally stored NAS COUNT as input to the ciphering algorithm. The receiver uses the NAS sequence number included in the received message (or estimated from the 5 bits of the NAS sequence number received in the message) and an estimate for the NAS overflow counter to form the NAS COUNT input to the deciphering algorithm.

A 128-bit ciphering algorithm may be used. According to TS 33.401 (also referred to as reference [2]), the input parameters to the ciphering process (also referred to as a ciphering algorithm) are a 128-bit cipher key named KEY, a 32-bit COUNT (i.e., NAS COUNT), a 5-bit bearer identity BEARER, the 1-bit direction of the transmission (i.e., DIRECTION), and the length of the keystream required (i.e., LENGTH). The DIRECTION bit shall be 0 for uplink and 1 for downlink.

Figure 4B:
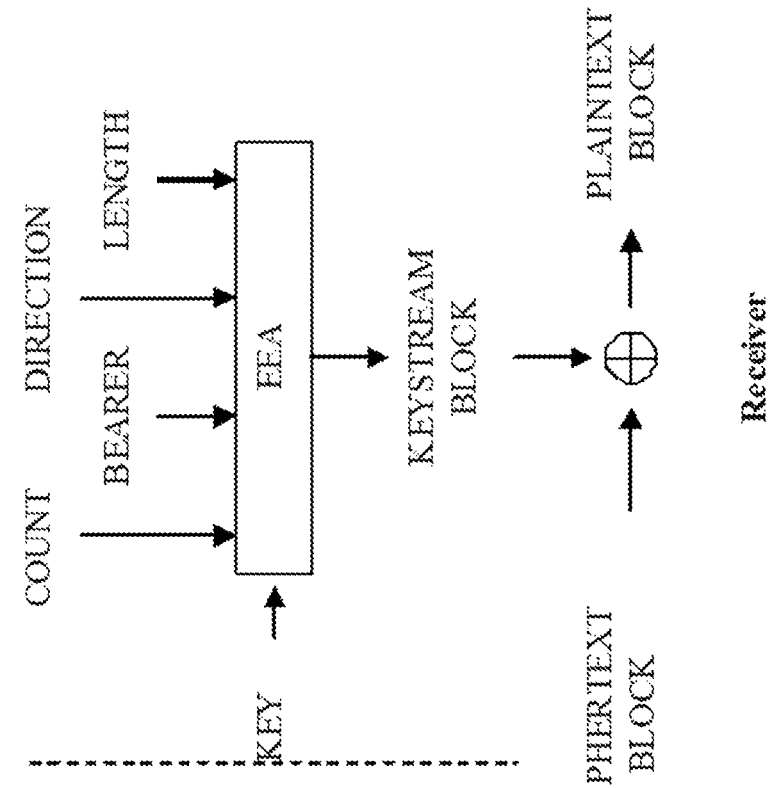
FIG. 4B illustrates ciphering of a data by receiver using of a 128-bit ciphering EEA process to cipher data of messages.
Figure 4A:
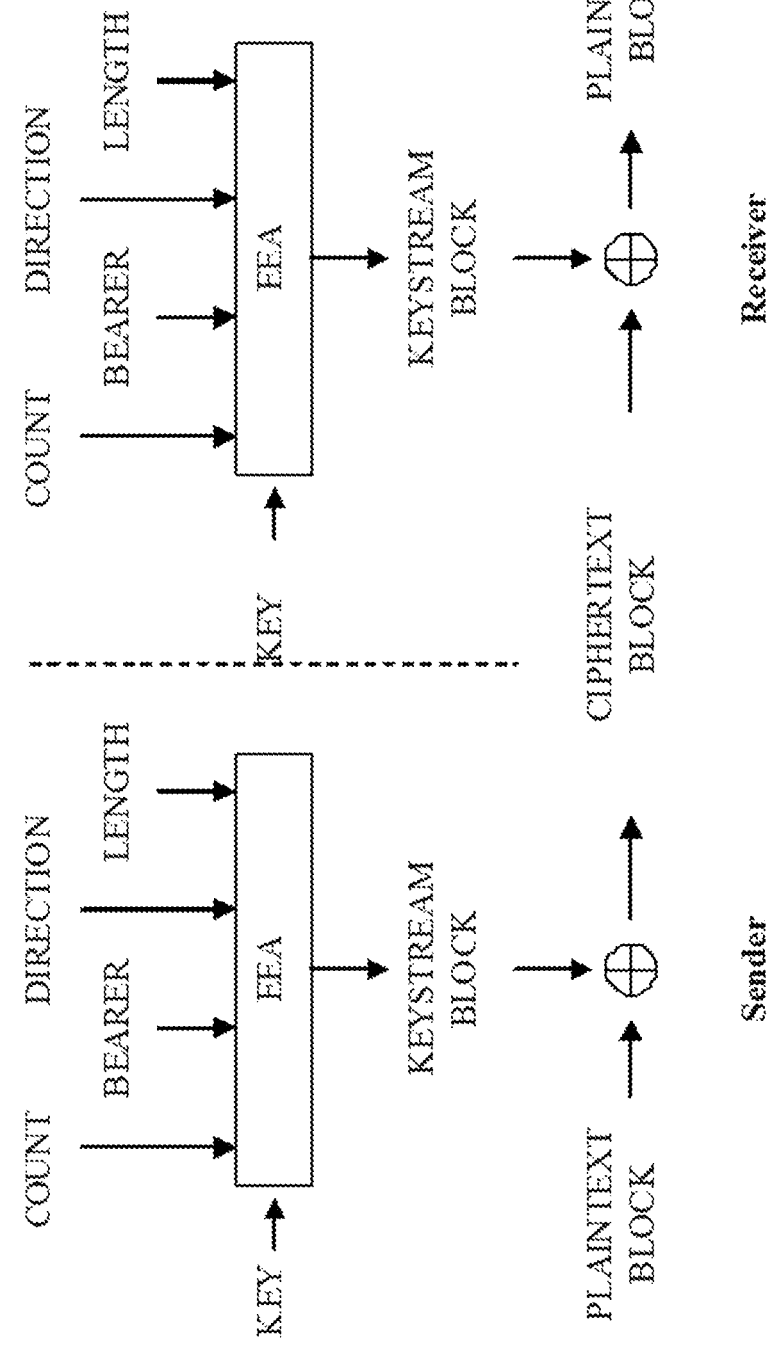
FIG. 4A illustrates ciphering of data by a transmitter (sender) using a 128-bit ciphering EEA process to cipher data of messages.

FIGS. 4A and 4B illustrate ciphering of data. Based on the input parameters, the EEA process generates the output keystream block KEYSTREAM which is used to encrypt the input plaintext block PLAINTEXT to produce the output ciphertext block CIPHERTEXT.

The support of multiple NAS connections terminated in the same AMF may give rise to new issues including future proofness, concurrency, agnosticism, and/or flexibility.

Regarding future proofness, the type categorization of accesses into 3GPP and non-3GPP is in fact future proof and can be applied to any new future access technology. Although it seems that there may be no need to support more than two NAS connections, it cannot be precluded with certainty that there will not be any future features or enhancements requiring the support of more than two simultaneous NAS connections, one over 3GPP and two over non-3GPP accesses (e.g., WiFi and satellite). For this reason, it may be better that the new security mechanism is not limited to two connections and that it efficiently supports an arbitrary (up to a limit) number of simultaneous connections.

Regarding concurrency, the introduction of multiple NAS connections may cause concurrency issues since it may now be possible for the system to run in parallel multiple NAS procedures over the different NAS legs. It is conceivable to mandate that the AMF executes the NAS procedures one at a time regardless of the NAS connection so that the underlying assumptions of the legacy security mechanism are preserved. This is not to be expected. For example, a failing NAS procedure on one NAS connection may put on hold all ongoing operations on the other NAS connection, for example, until a failure timer expires. This may be an undesirable design choice. Therefore, it may be better that the new security mechanism supports the parallel execution of NAS procedures on the different connections.

Regarding agnosticism, it is expected that the new security mechanism will provide the same security services regardless of the access type. The security services may include integrity, confidentiality, and replay protection. The security services should be provided in a transparent manner to the access type, in line with the general design principle of an access agnostic 5G architecture.

Regarding flexibility, the new feature of multiple NAS connections may give rise to new scenarios which were not possible in legacy Systems. For example, one NAS connection over an access type could be constantly active while another one over a different access type, abusing terminology, flickers. More precisely, the UE may be registered over one NAS leg while oscillating between the two registration states on the other leg. This is not to mention, that the UE could meanwhile perform several handovers involving AMF changes. Therefore, the new security mechanism may desirably be flexible enough to support such mobility scenarios.

According to some embodiments of inventive concepts, methods may be provided to secure parallel NAS connections. Such methods may be based on partly sharing the security context so that the master key (KASME-equivalent in 5G) is shared for different NAS connections with the same wireless terminal, while for each NAS connection with the same wireless terminal there is a dedicated separate pair of NAS COUNTs based on use of a NAS parameter called NAS CONN ID (NAS Connection Identification) to identify each NAS connection with the same wireless terminal.

According to some embodiments, disclosed methods/devices may address issues relating to future proofness, concurrency, agnosticism, and flexibility, while providing a similar/same level of security services and protection relative to NAS connection as in legacy systems.

Regarding multiple NAS connections, the following assumptions may be made.

First, there may be an AMF-specific key denoted by KAMF which is the KASME-equivalent in 5G Systems. This key is established via a successful authentication and is used to derive the NAS protocol protection keys, i.e. KNASint and KNASenc.

Second, the system may provide/guarantee the in-order delivery of the NAS messages on each leg (connection). More particularly, the underlying NAS transport assumptions from legacy systems may still apply but per NAS connection, but this does not preclude the parallel executions of NAS procedures on different connections.

Third, the choice of the cryptographic processes (also referred to as cryptographic algorithms) may apply to all the NAS connections indiscriminately. In other words, it may be assumed that there is no NAS connection-specific security negotiation. It is expected that the negotiation takes place once during the establishment and activation of the AMF key, e.g. the NAS SMC procedure-equivalent in 5G. The NAS SMC (Security Mode Command) procedure is described in detail in TS 33.401 (also referred to as reference [2]).

Figure 8:
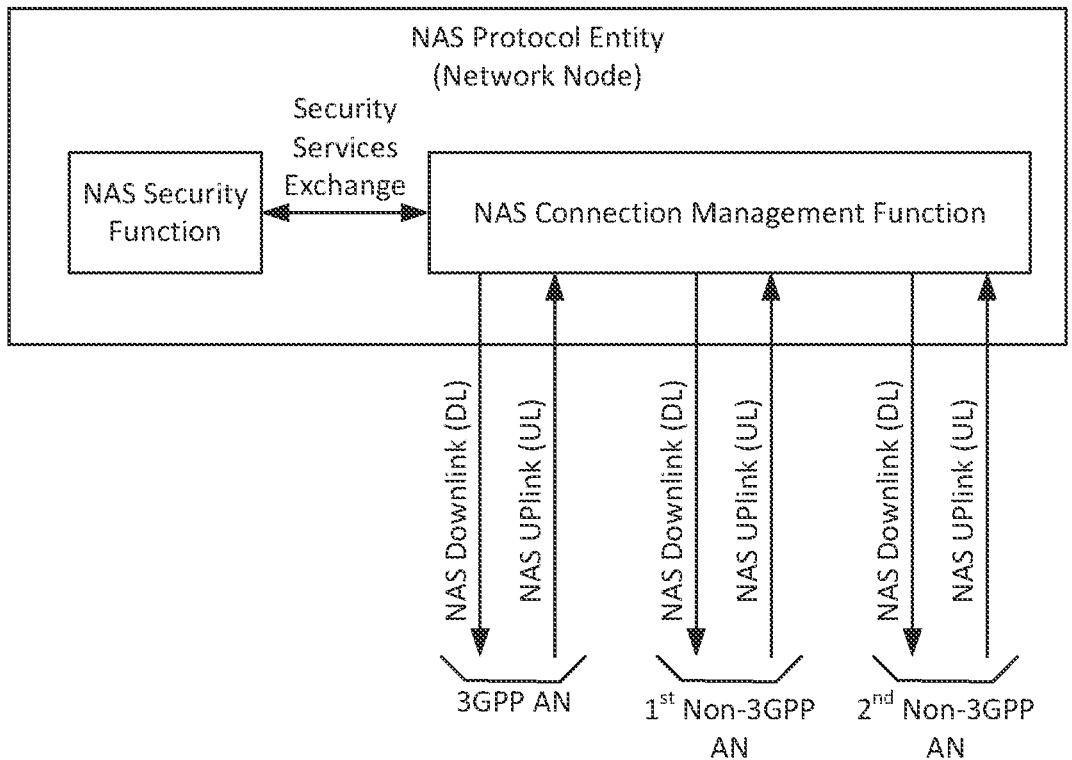
FIGS. 8 and 9 and block diagrams illustrating NAS Security Functions at the network node of FIGS. 5 and 7 and at the wireless terminal of FIGS. 5 and 6, respectively, according to some embodiments of inventive concepts.
Figure 9:
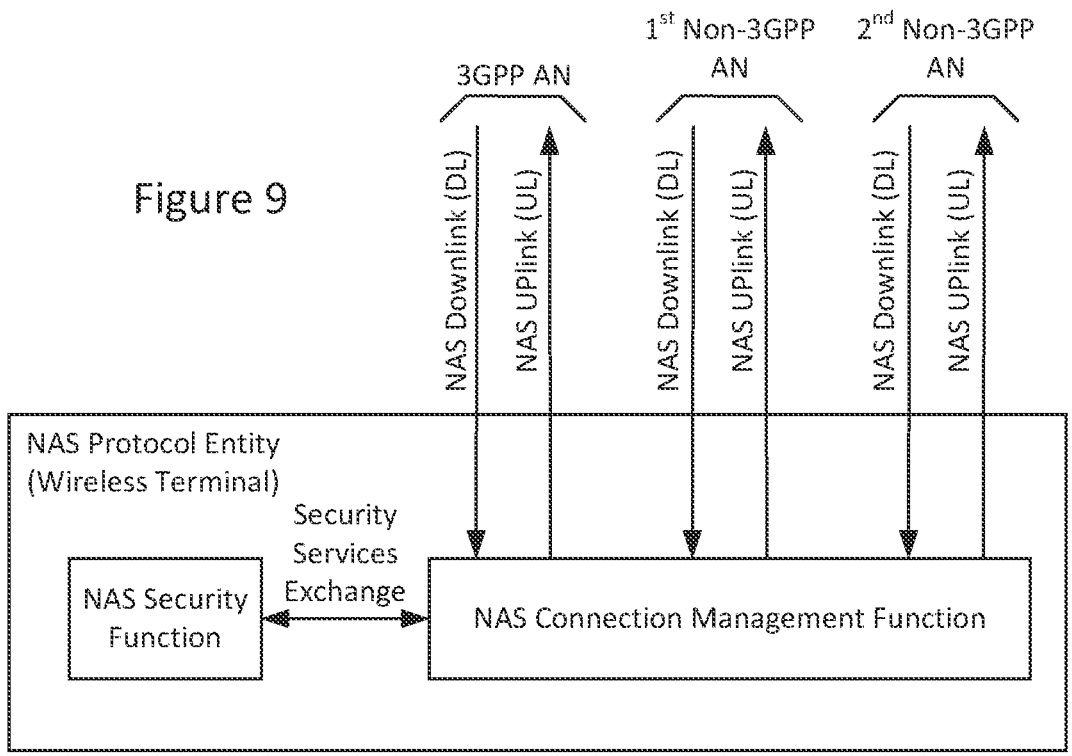

It may also be assumed that the NAS security is an additional function of NAS providing security services to the NAS protocol management entity as illustrated in FIGS. 8 and 9. Although, this could be left up to the implementation, the reference models of FIGS. 8 and 9 are provided as examples. For the reception of uplink NAS messages and transmission of downlink NAS messages, operations of the NAS Protocol Entity (including the NAS Security Function and the NAS Connection Management Function) of FIG. 8 may be performed by processor 703 of network node 501. For the reception of downlink NAS messages and transmission of uplink NAS messages, operations of the NAS Protocol Entity (including the NAS Security Function and the NAS Connection Management Function) of FIG. 9 may be performed by processor 603 of wireless terminal 505 of FIG. 6.

For example, NAS security services may be provided by a standalone security function which interacts with the other NAS protocol entities or functions. For example, the NAS connection management function may forward protected messages received on the uplink to the security function which performs the checks and cryptographic operations and returns back the outcome (e.g., whether integrity check fails or passes, and/or whether the message is deciphered, etc.). When a message is to be protected on the downlink, the NAS connection management function provides the payload to the security function which performs the necessary operations and returns the protected message.

FIGS. 8 and 9 illustrate NAS Security Functions at a core network node and at a wireless terminal, respectively.

For 5G, it is expected that the NAS security context may include the AMF key KAMF, the derived protection keys KNASint and KNASenc, and the key set identifier eKSI-equivalent in 5G. According to some embodiments of the present disclosure, a separate pair of NAS COUNTs may be used for each NAS connection with a wireless terminal in this NAS security context.

As discussed above, for each NAS connection, a separate pair of NAS COUNTs, one for each direction, may be used/maintained. Since the security keys are shared and to reduce/avoid key stream reuse, methods for cryptographic separation may be used/required. For this purpose, a NAS connection-specific parameter may be introduced, and this NAS connection-specific parameter may be referred to as the NAS connection identifier and denoted by NAS CONN ID.

The NAS CONN ID is a number that is incremented each time a new NAS connection is set up for a wireless terminal. In the security context, each NAS COUNT pair is associated with a unique NAS CONN ID value. The new parameter is used as a differentiator when interacting with the NAS security function to indicate which NAS connection each message belongs to. To keep track of unallocated NAS CONN ID values, an additional parameter may be used/needed. This new parameter, denoted by NEXT NAS CONN ID may also be part of the security context. The NEXT NAS CONN ID parameter is initially set to 0 and is incremented whenever a new NAS connection is set up for a wireless terminal. Each time a new NAS connection is created for a wireless terminal, it is allocated as an identifier the current NEXT NAS CONN ID value. More particularly, a new NAS COUNT pair is created and is associated with a NAS CONN ID whose value is set to the current NEXT NAS CONN ID value. The NEXT NAS CONN ID value is then incremented. The NAS Connection Identification NAS CONN ID can thus be used as an input (directly or indirectly) for authentication and/or ciphering/deciphering processes.

According to some embodiments of inventive concepts, when a new NAS COUNT pair is created, the values of the counters are set to 0. The NAS CONN ID may be an 8-bit value that is used to pad the NAS COUNT 24-bit internal representation when constructing the input to the NAS ciphering/deciphering and/or integrity processes. In legacy systems, the padding may always be set to 0 as described in TS 24.301 (also referred to as reference [3]). Since each NAS connection is identified by a unique NAS CONN ID, the padding provides/guarantees cryptographic separation for the messages travelling over different NAS connections.

Figure 10A:
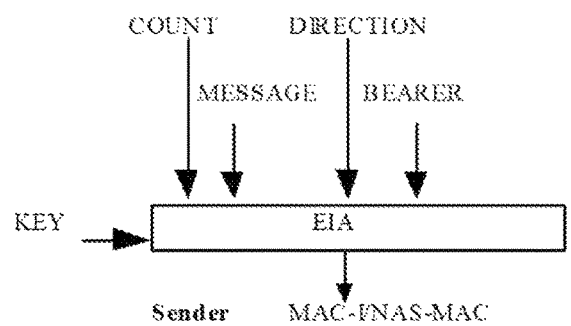
FIGS. 10A, 10B, 12A, and 12B illustrate use of an integrity process to authenticate integrity of NAS messages according to some embodiments of inventive concepts.
Figure 10B:
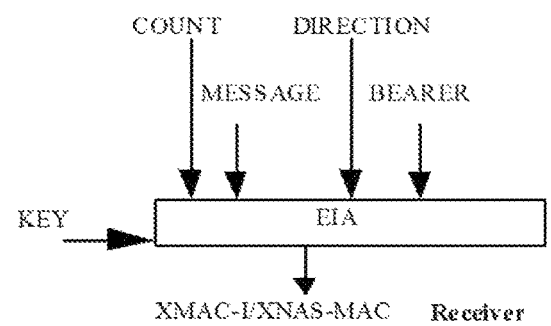

FIGS. 10A and 10B illustrate use of the integrity process EIA (also referred to as an integrity algorithm EIA) to authenticate the integrity of messages using the NAS CONN ID on the sender and receiver sides. By incorporating the NAS Connection Identification NAS CONN ID in the COUNT input, separation may be provided for authentication of different NAS connections for the same wireless terminal. The COUNT input, for example, may be a 32 bit value generated as a concatenation of the 8 bit NAS CONN ID for the NAS connection and the 24 bit NAS COUNT for the NAS connection (i.e., COUNT (32 bit)=NAS CONN ID (8 bit) II NAS COUNT (24 bit)). FIG. 10A thus illustrates use of the NAS CONN ID to derive MAC-I/NAS-MAC on the transmitter side, and FIG. 10B illustrates use of the NAS CONN ID to derive XMAC-I/XNAS-MAC on the receiver side.

Figure 11A:
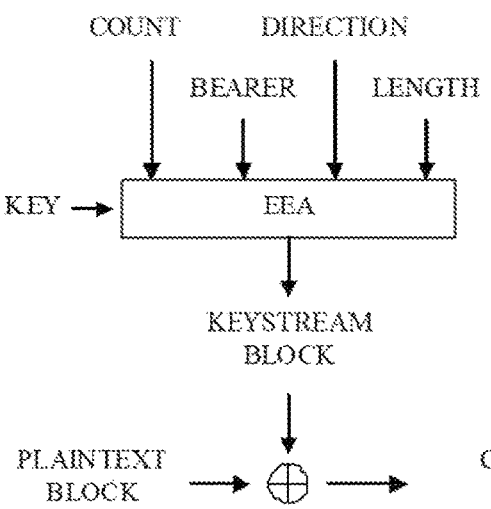
FIGS. 11A, 11B, 13A, and 13B illustrate use of a ciphering/deciphering process to cipher/decipher data of NAS messages according to some embodiments of inventive concepts.
Figure 11B:
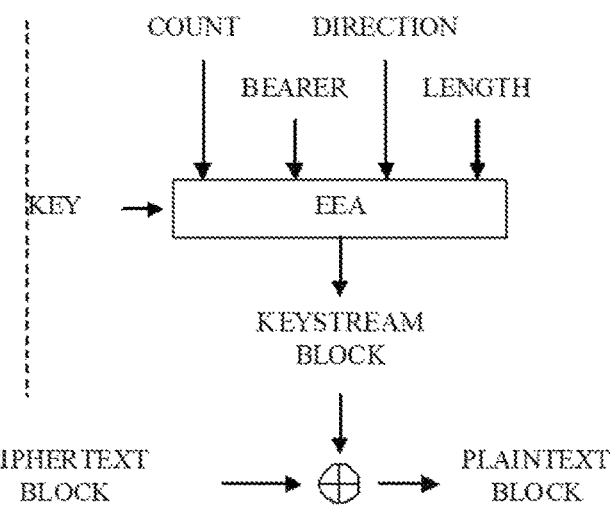

FIGS. 11A and 11B illustrate the use of the ciphering/deciphering algorithm EEA to cipher/decipher messages using the NAS CONN ID on the sender and receiver sides. By incorporating the NAS Connection Identification NAS CONN ID in the COUNT input, separation may be provided for ciphering/deciphering different NAS connections for the same wireless terminal. The COUNT input, for example, may be a 32 bit value generated as a concatenation of the 8 bit NAS CONN ID for the NAS connection and the 24 bit NAS COUNT for the NAS connection (i.e., COUNT (32 bit)=NAS CONN ID (8 bit) II NAS COUNT (24 bit)). FIG. 11A thus illustrates use of the NAS CONN ID to cipher the plaintext on the transmitter side, and FIG. 11B illustrates use of the NAS CONN ID to decipher the cipher text on the receiver side.

According to some other embodiments, the NAS CONN ID may be a 5-bit value that is used as the BEARER input for authentication and/or ciphering/deciphering processes as discussed below.

Figure 12A:
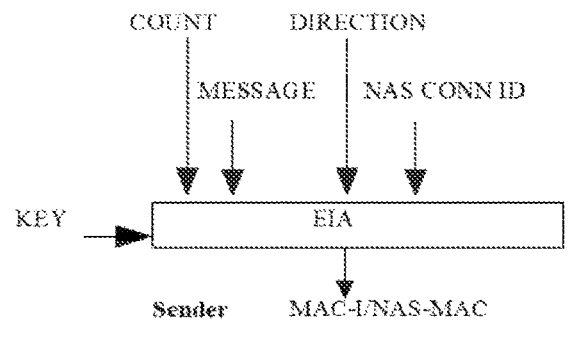
Figure 12B:
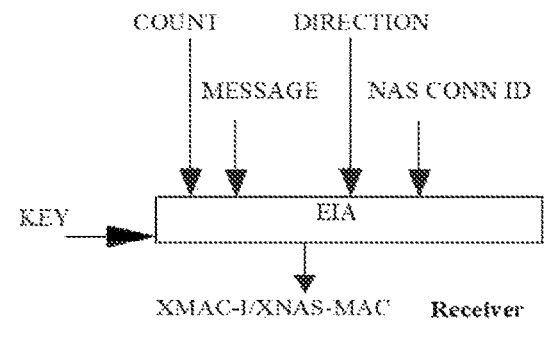

FIGS. 12A and 12B illustrate the use of the integrity algorithm EIA to authenticate the integrity of messages using the NAS CONN ID on the sender and receiver sides. By using the NAS Connection Identification NAS CONN ID as the BEARER input, separation may be provided for authentication of different NAS connections for the same wireless terminal. FIG. 12A thus illustrates use of the NAS CONN ID as the BEARER input to derive MAC-I/NAS-MAC on the transmitter side, and FIG. 12B illustrates use of the NAS CONN ID as the BEARER input to derive XMAC-I/XNAS-MAC on the receiver side.

Figure 13A:
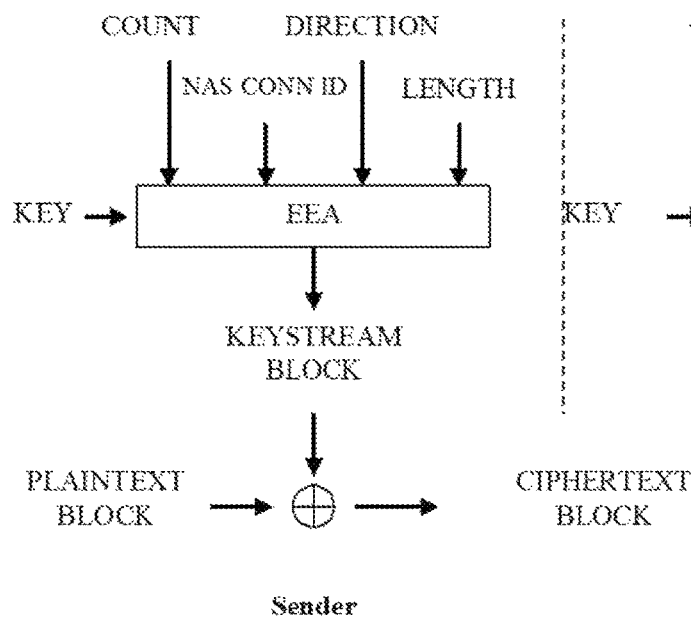
Figure 13B:
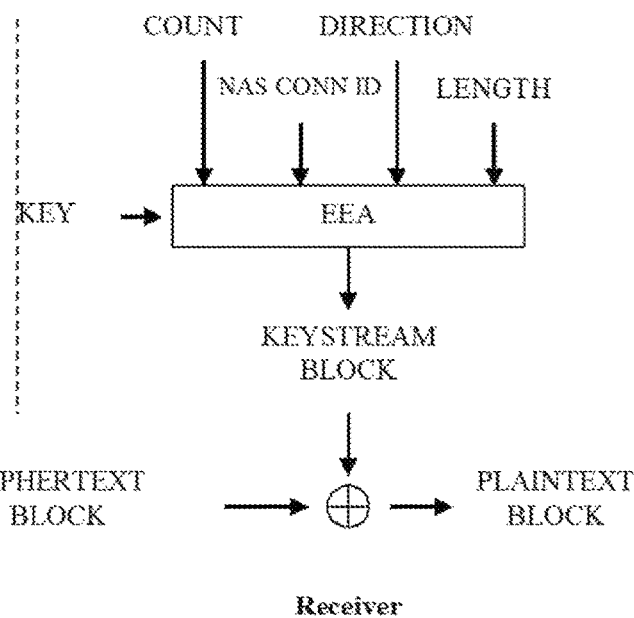

FIGS. 13A and 13B illustrate the use of the ciphering/deciphering process EEA to cipher/decipher messages using the NAS CONN ID on the sender and receiver sides. By using the NAS Connection Identification NAS CONN ID as the BEARER input, separation may be provided for ciphering/deciphering of different NAS connections for the same wireless terminal. FIG. 13A thus illustrates use of the NAS CONN ID as the BEARER input to cipher the plain text on the transmitter side, and FIG. 13B illustrates use of the NAS CONN ID as the BEARER input to decipher the cipher text on the receiver side.

Operations providing integrity authentication and/or ciphering/deciphering of FIGS. 10A-B, 11A-B, 12A-B, and/or 13A-B will now be discussed with respect to the flow chart of FIGS. 17A and 17B.

Operations of a communication node will now be discussed with reference to the flow chart of FIG. 17A and the modules of FIG. 17B. For example, modules of FIG. 17B may be stored in memory of the communication node (e.g., wireless terminal memory 605 of FIG. 6 if the communication node is a wireless terminal, or network node memory 705 of FIG. 7 if the communication node is a network node), and these modules may provide instructions so that when the instructions of a module are executed by the communication node processor (e.g., wireless terminal processor 603 if the communication node is a wireless terminal, or network node processor 705 if the communication node is a network node), the processor performs respective operations of the flow chart of FIG. 17A.

As discussed above with respect to FIG. 5, first and second NAS connections may be provided between first and second communication nodes, such as between wireless terminal 505 and network node 501 (e.g., a core network node). The communication node processor may provide a first NAS connection identification for a first NAS connection between the first and second communication nodes at block 1711 (e.g., using first identification module 1751). The communication node processor may also provide a second NAS connection identification for a second NAS connection between the first and second communication nodes at block 1713 (e.g., using second identification module 1753). Moreover, the first and second NAS connection identifications are different, and the first and second NAS connections are different.

For a communication over the first NAS connection at block 1717, the communication node processor may communicate a first NAS message between the first and second communication nodes over the first NAS connection (e.g., using first communication module 1757). More particularly, communicating the first NAS message may include at least one of performing integrity protection for the first NAS message using the first NAS connection identification and/or performing confidentiality protection for the first NAS message using the first NAS connection identification.

For a communication over the second NAS connection at block 1719, the communication node processor may communicate a second NAS message between the first and second communication nodes over the second NAS connection (e.g., using second communication module 1759). More particularly, communicating the second NAS message may include at least one of performing at least one of performing integrity protection for the second NAS message using the second NAS connection identification and/or performing confidentiality protection for the second NAS message using the second NAS connection identification.

The first and second NAS connections share a master key of a NAS security context. Moreover, communicating the first NAS message may include at least one of performing integrity protection for the first NAS message using the first NAS connection identification and the master key and/or performing confidentiality protection for the first NAS message using the first NAS connection identification and the master key. Similarly, communicating the second NAS message may include at least one of performing integrity protection for the second NAS message using the second NAS connection identification and the master key and/or performing confidentiality protection for the second NAS message using the second NAS connection identification and the master key.

Operations of FIG. 17A may be performed by a communication node that is transmitting NAS messages (e.g., wireless terminal 505 in the uplink, or network node 501 in the downlink). As discussed above, the first and second NAS connections may share a master key of a NAS security context. At block 1717, communicating the first NAS message may include performing integrity protection by generating a first message authentication code based on the first NAS connection identification, the master key, and the first NAS message, and transmitting the first NAS message with the first message authentication code over the first NAS connection to the second communication node. At block 1719, communicating the second NAS message may include performing integrity protection for the second NAS message by generating a second message authentication code based on the second NAS connection identification, the master key, and the second NAS message, and transmitting the second NAS message with the second message authentication code over the second NAS connection to the second communication node.

According to some embodiments for the transmitting node, the first NAS connection identification may be concatenated with a first NAS count for the first NAS message, the concatenation of the first NAS connection identification and the first NAS count may be provided as an input to generate the first message authentication code, the second NAS connection identification may be concatenated with a second NAS count for the second NAS message, and the concatenation of the second NAS connection identification and the second NAS count may be provided as an input to generate the second message authentication code. According to some other embodiments for the transmitting node, the first NAS connection identification may be provided as an input to generate the first message authentication code, and the second NAS connection identification may be provided as an input to generate the second message authentication code. According to still other embodiments for the transmitting node, the master key and the first NAS connection identification may be used to derive a first integrity protection key used to generate the first message authentication code, and the master key and the second NAS connection identification may be used to derive a second integrity protection key used to generate the second message authentication code. Moreover, performing integrity protection for the first NAS message may include performing integrity protection for the first NAS message using a 5G compatible EIA integrity protection interface, and performing integrity protection for the second NAS message may include performing integrity protection for the second NAS message using the 5G compatible EIA integrity protection interface.

Operations of FIG. 17A may be performed by a communication node that is transmitting NAS messages (e.g., wireless terminal 505 in the uplink, or network node 501 in the downlink). As discussed above, the first and second NAS connections may share a master key of a NAS security context. At block 1717, communicating the first NAS message may include performing confidentiality protection for the first NAS message by ciphering the first NAS message using the first NAS connection identification and the master key to provide a first ciphered NAS message, and transmitting the first ciphered NAS message over the first NAS connection to the second communication node. At block 1719, communicating the second NAS message may include performing confidentiality protection for the second NAS message by ciphering the second NAS message using the second NAS connection identification and the master key to provide a second ciphered NAS message, and transmitting the second ciphered NAS message over the second NAS connection to the second communication node.

According to some embodiments for the transmitting node, the first NAS connection identification may be concatenated with a first NAS count for the first NAS message, the concatenation of the first NAS connection identification and the first NAS count may be provided as an input to generate the first ciphered NAS message, the second NAS connection identification may be concatenated with a second NAS count for the second NAS message, and the concatenation of the second NAS connection identification and the second NAS count may be provided as an input to generate the second ciphered NAS message. According to some other embodiments of the transmitting node, the first NAS connection identification may be provided as an input to generate the first ciphered NAS message, and the second NAS connection identification may be provided as an input to generate the second ciphered NAS message. According to still other embodiments of the transmitting node, the master key and the first NAS connection identification may be used to derive a first ciphering key that is used to generate the first ciphered NAS message, and the master key and the second NAS connection identification may be used to derive a second ciphering key that is used to generate the second ciphered NAS message. The ciphering the first NAS message may include ciphering the first NAS message using EEA ciphering, and the ciphering the second NAS message comprises ciphering the second NAS message using the EEA ciphering. Moreover, performing confidentiality protection for the first NAS message may include performing confidentiality protection for the first NAS message using a 5G compatible EEA ciphering interface, and performing confidentiality protection for the second NAS message may include performing confidentiality protection for the second NAS message using the 5G compatible EEA ciphering interface.

Operations of FIG. 17A may be performed by a communication node that is receiving NAS messages (e.g., a wireless terminal on the downlink, or a network node of the uplink). As discussed above, the first and second NAS connections may share a master key of a NAS security context. At block 1715, communicating the first NAS message may include receiving the first NAS message with a first message authentication code over the first NAS connection from the second communication node, performing the integrity protection of the first NAS message by generating a first derived message authentication code for the first NAS message based on the first NAS connection identification, the master key, and the first NAS message, and processing the first NAS message responsive to the first message authentication code and the first derived message authentication code matching. At block 1719, communicating the second NAS message may include receiving the second NAS message with a second message authentication code over the second NAS connection from the second communication node, performing the integrity protection for the second NAS message by generating a second derived message authentication code for the second NAS message based on the second NAS connection identification, the master key, and the second NAS message, and processing the second NAS message responsive to the second message authentication code and the second derived message authentication code matching.

According to some embodiments for the receiving node, the first NAS connection identification may be concatenated with a first NAS count for the first NAS message, the concatenation of the first NAS connection identification and the first NAS count may be provided as an input to generate the first derived message authentication code, the second NAS connection identification may be concatenated with a second NAS count for the second NAS message, and the concatenation of the second NAS connection identification and the second NAS count may be provided as an input to generate the second derived message authentication code. According to some other embodiments for the receiving node, the first NAS connection identification may be provided as an input to generate the first derived message authentication code, and the second NAS connection identification may be provided as an input to generate the second derived message authentication code. According to still other embodiments for the receiving node, the master key and the first NAS connection identification may be used to derive a first integrity protection key used to generate the first derived message authentication code, and the master key and the second NAS connection identification may be used to derive a second integrity protection key used to generate the second derived message authentication code. Moreover, performing integrity protection for the first NAS message may include performing integrity protection for the first NAS message using a 5G compatible EIA integrity protection interface, and performing integrity protection for the second NAS message may include performing integrity protection for the second NAS message using the 5G compatible EIA integrity protection interface.

Operations of FIG. 17A may be performed by a communication node that is receiving NAS messages (e.g., a wireless terminal on the downlink, or a network node of the uplink). As discussed above, the first and second NAS connections may share a master key of a NAS security context. At block 1717, communicating the first NAS message may include receiving a first ciphered NAS message over the first NAS connection from the second communication node, performing confidentiality protection for the first NAS message by deciphering the first ciphered NAS message using the first NAS connection identification and the master key to provide a first deciphered NAS message, and processing the first deciphered NAS message. At block 1719, communicating the second NAS message may include receiving a second ciphered NAS message over the second NAS connection from the second communication node, performing confidentiality protection for the second NAS message by deciphering the second ciphered NAS message using the second NAS connection identification and the master key to provide a second deciphered NAS message, and processing the second deciphered NAS message.

According to some embodiments for the receiving node, the first NAS connection identification may be concatenated with a first NAS count for the first NAS message, the concatenation of the first NAS connection identification and the first NAS count may be provided as an input to generate the first deciphered NAS message, the second NAS connection identification may be concatenated with a second NAS count for the second NAS message, and the concatenation of the second NAS connection identification and the second NAS count may be provided as an input to generate the second ciphered NAS message. According to some other embodiments for the receiving node, the first NAS connection identification may be provided as an input to generate the first deciphered NAS message, and the second NAS connection identification may be provided as an input to generate the second deciphered NAS message. According to still other embodiments for the receiving node, the master key and the first NAS connection identification may be used to derive a first deciphering key used to generate the first deciphered NAS message, and the master key and the second NAS connection identification may be used to derive a second deciphering key used to generate the second deciphered NAS message. Moreover, performing confidentiality protection for the first NAS message may include performing confidentiality protection for the first NAS message using a 5G compatible EEA deciphering interface, and performing confidentiality protection for the second NAS message may include performing confidentiality protection for the second NAS message using the 5G compatible EEA deciphering interface.

In embodiments of FIG. 17A, the first NAS connection may be provided through a 3GPP access node between the first and second communication nodes, and the second NAS connection may be provided through a non-3GPP access node between the first and second communication nodes; or the first NAS connection may be provided through a non-3GPP access node between the first and second communication nodes and the second NAS connection may be provided through a 3GPP access node between the first and second communication nodes. For example, the 3GPP access node may include a radio access network base station, and the non-3GPP access node may include at least one of a WiFi access node and/or a satellite access node.

Moreover, the first and second NAS connections of FIG. 17A may be maintained concurrently between the first and second communication nodes. In addition, a Packet Data Unit (PDU) session may be established based on the first and second NAS messages to communicate user plane data between the first and second communication nodes.

Various operations of FIG. 17A and/or modules of FIG. 17B may be optional with respect to some embodiments of communication nodes and related methods. Regarding methods of example embodiment 1 (set forth below), for example, operations of block 1715 of FIG. 17B may be optional.

According to some other embodiments of inventive concepts, cryptographic separation may be provided at the level of the keys. NAS protection keys may be derived in legacy systems as described in TS 33.401 (also referred to as reference [2]).

In general, all key derivations (including input parameter encoding) for LTE may be performed using the key derivation function (KDF) specified in TS 33.220 (also referred to as reference [4]). The KDF takes in as input a key and a string S. The derived key is obtained by applying the HMAC-SHA-256 (described in RFC 2104, also referred to as reference [5]) to the input key and string S. The string S is constructed by concatenating a distinguisher parameter referred to as FC and a set of other parameters and their respective lengths: S=FC||P0||L0||P1||L1||P2||L2||P3||L3|| . . . || Pn||Ln, where Pi (i from 0 to n) is a parameter and Li is its length in octets.

According to clause A.7 of TS 33.401 (also referred to as reference [2]), when deriving keys for NAS integrity and NAS encryption processes (also referred to as algorithms) from KASME and process/algorithm types and IDs, the below listed parameters may/shall be used to form the string S: FC=0x15; P0=process type distinguisher; L0=length of process type distinguisher (i.e. 0x00 0x01); P1=process identity; L1=length of process identity (i.e. 0x00 0x01).

The process type distinguisher shall be NAS-enc-alg for NAS encryption processes and NAS-int-alg for NAS integrity protection processes. (see table A.7-1). FIG. 14 is a table illustrating process type distinguishers.

The process identity (as specified in clause 5 of TS 33.401, also referred to as reference [2]) may/shall be put in the four least significant bits of the octet. The two least significant bits of the four most significant bits may be reserved for future use, and the two most significant bits of the most significant nibble may be reserved for private use. The entire four most significant bits may/shall be set to all zeros.

For NAS process key derivations, the input key may/shall be the 256-bit KASME. For a process key of length n bits, where n is less or equal to 256, the n least significant bits of the 256 bits of the KDF output may/shall be used as the process key (also referred to as an algorithm key).

As discussed above with respect to FIGS. 10A-B, 11A-B, 12A-B, and 13A-B, the NAS Connection Identifier NAS CONN ID may be used in the authentication and/or ciphering/deciphering processes to provide separation for different NAS connections used by a same wireless terminal.

According to some embodiments, the NAS CONN ID may be used in the derivation of the NAS protection keys KNASenc and KNASint. The resulting protection keys may thus be NAS connection-specific to provide separation for different NAS connections used by the same wireless terminal.

For example, a new parameter P2 may be introduced for the construction of the input S string. This parameter P2 would be the NAS CONN ID and its length L2 would be whatever length the NAS CONN ID has (in octets). For example, if the NAS CONN ID is 8 bits long then L2 is 1 (for one octet). If the NAS CONN ID is specified to be a 32-bits long value, then L2 would be set to the constant 4 (for four octets). All the other parameters (P0, P1) may remain the same or may be based on the 5G-equivalents.

FIG. 15 illustrates Key derivation based on the S string where the NAS CONN ID is used in the derivation of the S string. Here, the master key KAMF and S are provided as inputs to the key derivation function KDF to generate the KEY K that is used for EIA authentication and/or EEA ciphering/deciphering. In FIG. 15:

KAMF is the KASME-equivalent in 5G;

S is constructed as the concatenation FC||P0||L0||P1||L1||P2||L2 where: FC is potentially a new distinguisher for the derivation of the NAS protection key, P0, P1, L0 and L1 are based on potentially new parameters and values equivalent to the ones used in the LTE. In fact, the algorithms in 5G could potentially have other names and other type distinguisher values, etc., P2 and L2 are the new parameters based on the NAS CONN ID.

Depending on the FC value, the same procedure is used to derive a NAS integrity protection key or a NAS ciphering key. Since the NAS CONN ID is used in the derivation function, those keys would be then NAS connection specific.

According to some other embodiments, the NAS CONN ID may be used to derive a new level key KNAS from the KAMF key which is then used to derive the other lower level protection keys. The KNAS and the derived protection keys may thus be NAS connection-specific.

For example, a new key called KNAS may be derived from the KAMF as shown in FIG. 16 where S is set to FC||P0||L0 with FC having a new value and P0, L0 corresponding to the NAS CONN ID. In fact, P0 and L0 are defined similarly to P2 and L2 as discussed above with respect to FIG. 15. Because the NAS CONN ID is used in the derivation of this new intermediary key, it is thus NAS connection specific. Everything that is subsequently derived from the KNAS key would be also NAS connection specific. Therefore, it is proposed to derive the NAS protection key KNASint and KNASenc from the KNAS similarly to how it is done in legacy systems when they are derived from the KASME.

The overall key derivation scheme producing the NAS protection keys may thus be provided as illustrated in FIG. 16. In embodiments of providing key derivation based on the NAS CONN ID, a larger number of connection specific parameters may be used/needed compared to embodiments discussed above with respect to FIGS. 10A-B, 11A-B, 12A-B, and 13A-B.

According to mechanisms discussed above, cryptographic separation may be provided/guaranteed while securing parallel NAS connections using the same keys. For each NAS connection, a separate pair of NAS COUNT values, one for each direction (UPLINK UL and DOWNLINK DL), is maintained. The NAS COUNT values would then be handled in a similar manner to how it is done using 3GPP mechanisms (see reference [2]). Since the security keys are shared and to reduce/avoid key stream reuse, a new NAS connection-specific parameter is introduced, called the NAS connection identifier and denoted by NAS CONN ID (NAS CID, or CID for short).

The NAS CID is a number that is incremented each time a new NAS connection is set up. In the security context, each NAS COUNT pair is associated with a unique NAS CID value. The new parameter is used as the differentiator when interacting with the NAS security function to indicate which NAS connection each message belongs to. To keep track of unallocated NAS CID values, an additional parameter may be used/needed. This new parameter, denoted by NEXT NAS CID is also part of the security context. The NEXT NAS CID parameter is initially set to 0 and is incremented whenever a new NAS connection is set up. Each time a new NAS connection is created, it is allocated the current NEXT NAS CID value as the identifier. More particularly, a new pair of NAS COUNT values is created and associated with a NAS CID whose value is set to the current NEXT NAS CID value. The NEXT NAS CID value is then incremented.

In addition, it may be useful to synchronize the new CID values between the AMF and the UE and the associated NAS COUNT values when a new NAS connection is set up. For example, a Security Mode Command SMC may be run. The SMC would then allow for a synchronized resetting of the NAS COUNT values. In known systems, however, an SMC may only be run after initial authentication, or whenever the keys are refreshed, or after a mobility event involving an MME change (such that the NAS protection algorithms need to be changed).

According to some embodiments of inventive concepts, the NAS CID may be signaled by the UE in the initial registration request, and the associated NAS COUNT values for the new NAS connection may (always) be synchronized via an SMC procedure. In addition, the AMF may (always) override the CID allocated by the UE during this SMC procedure.

According to some embodiments of inventive concepts, additional specific messages may not be required to signal or synchronize the CID since it is reusing existing messages. Moreover, some embodiments of inventive concepts may adhere to the same/similar principle and best practices as used to activate security and reset NAS COUNT values as in prior systems where an SMC may be required. In addition, some embodiments of inventive concepts may give the network full control over the CID allocation (even though the allocation scheme could be completely deterministic) by allowing the AMF to override the UE selected CID in the SMC. Furthermore, some embodiments of inventive concepts may provide cryptographic separation by (always) synchronizing the start of the usage of the new CID between the UE and the AMF through the SMC. Some embodiments of inventive concepts may be implemented with little/no impact on the Radio Access Network RAN keys, because the RAN keys (KeNB and/or KgNB) may be derived after the SMC procedure has taken place, when the AMF initiates the Initial Context Setup procedure with RAN.

According to some embodiments of inventive concepts, an AMF-specific key (denoted by KAMF) may be provided which is the KASME-equivalent in 5G Systems. This key may be established via a successful authentication and is used to derive the NAS protocol protection keys (i.e., KNASint and KNASenc). The system may provide/guarantee the in-order delivery of the NAS messages on each leg (connection), so that underlying NAS transport assumptions may still apply but per NAS connection. This may not preclude the parallel executions of NAS procedures on different connections. The choice of cryptographic algorithms may apply to all the NAS connections indiscriminately. Stated in other words, it may be assumed that there is no NAS connection-specific security negotiation. It may be expected that the negotiation takes place once during the establishment and activation of the AMF key (e.g., the NAS SMC procedure-equivalent in 5G). The NAS SMC procedure is described in detail in TS 33.401 (also referred to as reference [2]).

Figure 18:
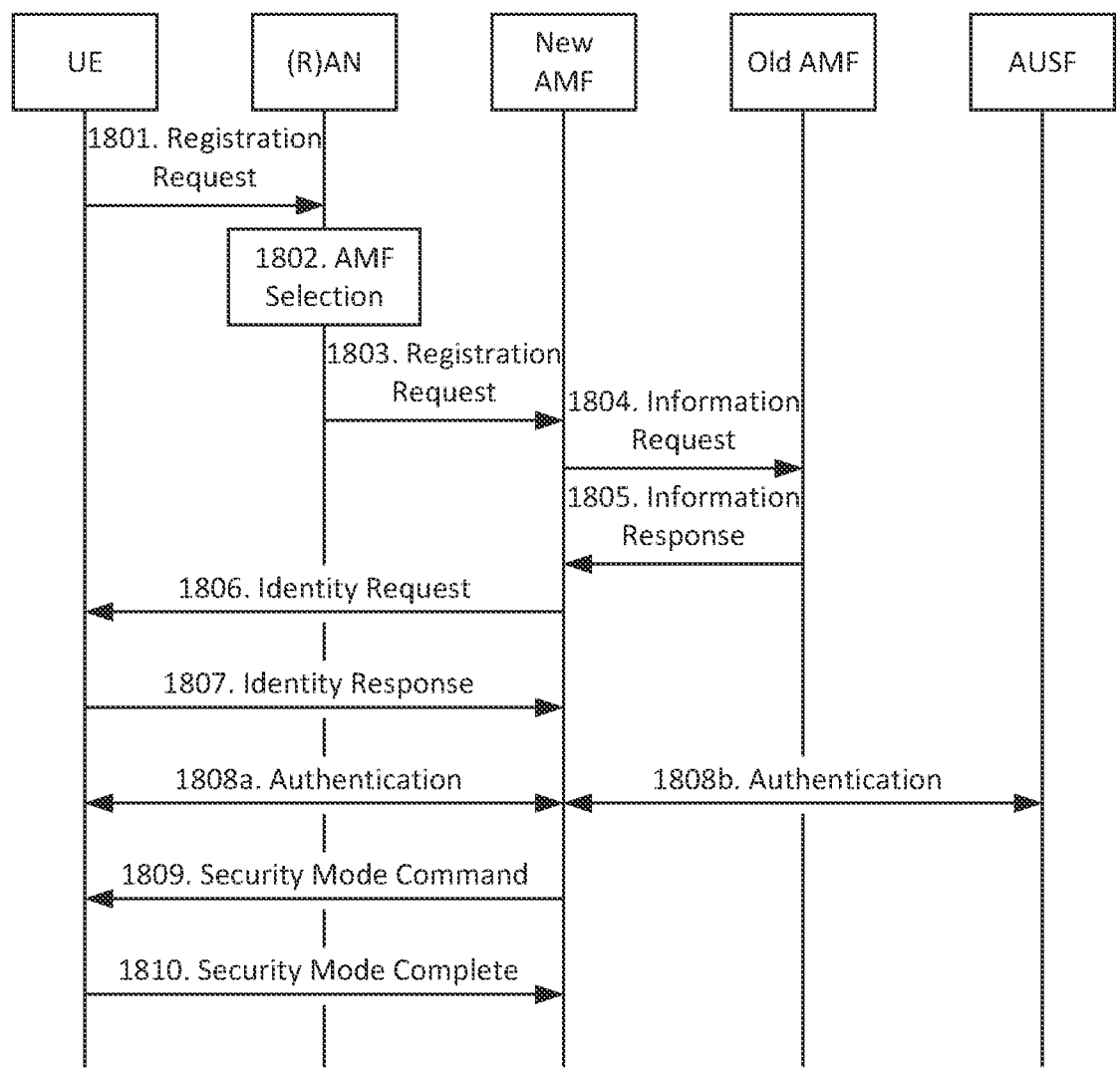
FIG. 18 is a message diagram illustrating registration operations establishing a NAS connection.

FIG. 18 is a message diagram illustrating an initial portion of the registration procedure as specified in TS 23.502 (also referred to as reference [6]). The registration procedure of FIG. 18 is discussed below.

Operation 1801. An initial Access Node AN message containing the registration request is sent from the wireless terminal UE to the Access Node (e.g., Radio Access Node RAN).

Operation 1802. The AN performs selection of the serving AMF potentially based on the information provided in the message of operation 101.

Operation 1803. The registration request is forwarded from the Access node to the serving AMF.

Operation 1804. [Conditional] Based on the information provided to the serving AMF, the serving AMF (e.g., new AMF of FIG. 18) may need to retrieve the UE context from another AMF (e.g., the Old AMF of FIG. 18), should there be one, using an information request.

Operation 1805. [Conditional] The old serving AMF may provide the UE context to the new serving AMF using an information response.

Operation 1806. [Conditional] If needed, the new AMF may request the subscriber unique permanent identity (SUPI) using an identity request.

Operation 1807. [Conditional] The UE may provide its permanent identity to the new AMF using an identity response.

Operations 1808*a* and 1808*b*. [Conditional] Depending on security policy and/or if the UE is registering for the first time, an authentication procedure may be run between the Authentication Server Function AUSF and the wireless terminal UE. When successful, the authentication procedure leads to the establishment of a shared key (KAMF) between the UE and the AMF that is to be used for subsequent key derivation and security procedures. In case the UE has been authenticated earlier through another AMF, the key could have been provided to the new AMF already in message/operation 1805. In such cases, a new authentication procedure would not necessarily be needed.

Operation 1809. The AMF may transmit a Security Mode Command SMC message to the wireless terminal UE.

Operation 1810. Responsive to receiving the SMC message, the wireless terminal UE may transmit a Security Mode Complete message.

The registration flow of FIG. 18 may be generic and may not really make a distinction based on the type of the access network. For example, the (R)AN node of FIG. 18 could be a gNB or a non-3GPP InterWorking Function N3IWF. Now if the UE has already been registered and has already established a security context over an access network, the question is how to secure the connection when the UE additionally registers over another type of access network. The security mechanism assumes the one described above with respect to FIGS. 5-9, 10A, 10B, 11A, 11B, 12A, 12B, 13A, 13B, 15-16, 17A, and 17B. That is, following the initial registration, a CID value (e.g., nas_cid_1) and a fresh pair of NAS COUNT values (e.g., nas_ul_count_1 for the uplink and nas_dl_count_2 for the downlink) may have already been allocated and taken into use to secure the first NAS connection.

According to some embodiments of inventive concepts, when the wireless terminal UE attempts to register over a different type of access network, the UE may allocate a new CID value (e.g., nas_cid_2) and a new pair of fresh NAS COUNT values (e.g., nas_ul_count_2 for the uplink and nas_dl_count_2 for the downlink), and the UE may secure the new NAS connection using the new parameters already from the start. Consequently, the registration request may be integrity protected using the new CID value and the new NAS COUNT values.

In order to reduce/avoid synchronization failures, the new CID value allocated by the UE may be included in the registration request and integrity protected alongside any other information that the message is supposed to include.

Furthermore, should the AMF decide to allocate a different CID value, this different CID value can be signaled in the SMC message. In such case, any new CID value provided by the AMF may override the CID value allocated by the UE and may be immediately taken into use by the Security Mode Command SMC procedure.

Figure 19:
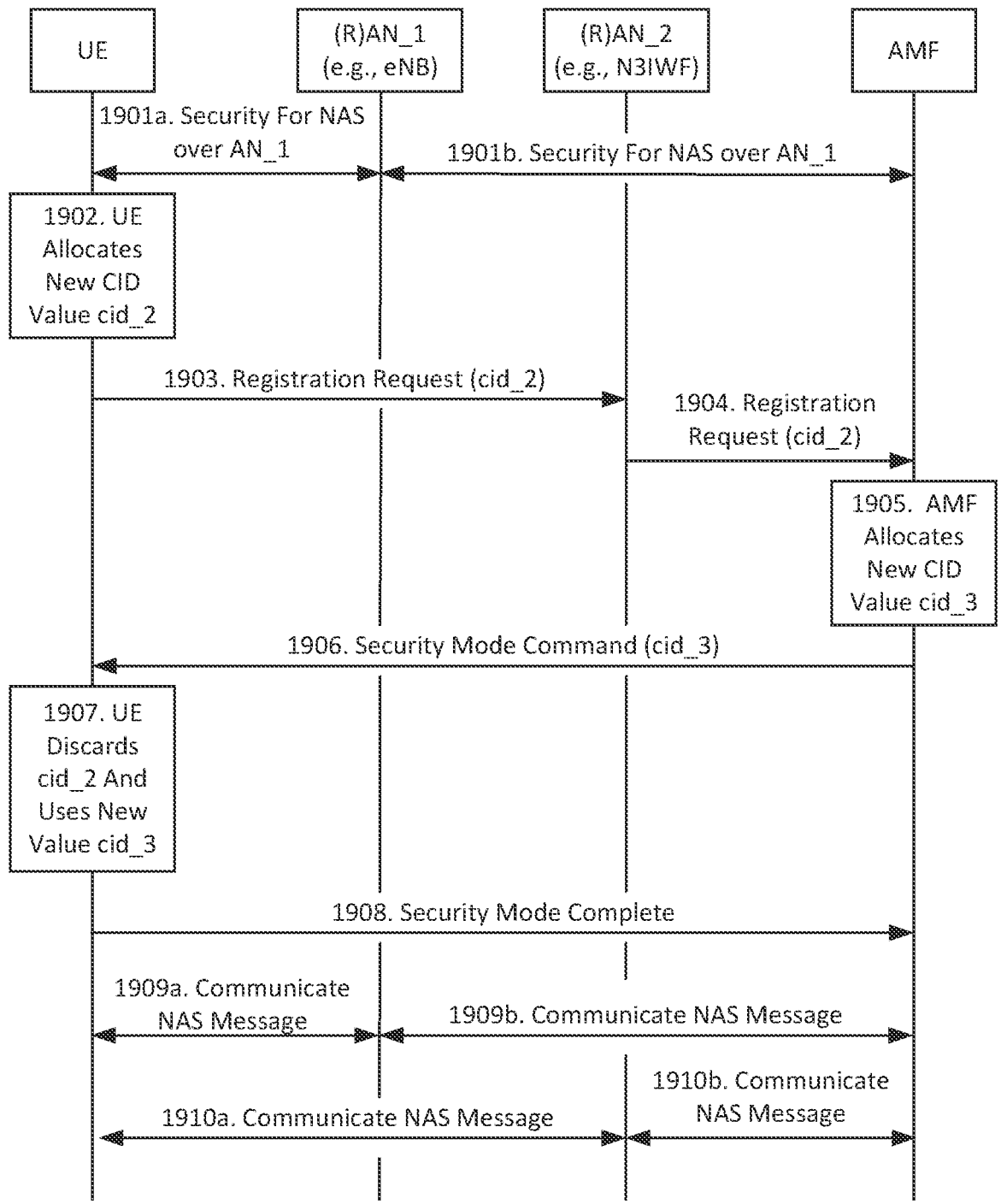
FIG. 19 is a message diagram illustrating registration operations establishing a subsequent NAS connection according to some embodiments of inventive concepts.

FIG. 19 illustrates additional registration flow operations with explicit signaling of a CID or CIDs for a second NAS connection after a first NAS connection has been established as discussed above with respect to FIG. 18.

Operations 1901*a* and 1901*b*. It is assumed that the wireless terminal UE is registered over an access network type (e.g., 3GPP). As a consequence, security keys have been established and a CID value (e.g., cid_1) has been allocated together with a fresh pair of NAS COUNT values to secure the first NAS connection over (R)AN_1. These operations may be performed as discussed above with respect to FIG. 18.

Operation 1902. The UE determines to register over another type of access network (e.g., non-3GPP). Therefore, the UE allocates a new CID value (e.g., cid_2) and a fresh pair of NAS COUNT values.

Operation 1903. The UE sends a registration request to the new access network (R)AN_2 with integrity protection using the new NAS connection parameters. The UE may include the new CID value cid_2 in the request.

Operation 1904. The registration request is forwarded to the serving AMF.

Operation 1905. The AMF checks the integrity of the message and if successful, the AMF may accept the provided CID value, allocate new fresh NAS COUNT values to the new connection, and continue to use these CID and NAS COUNT values to secure the newly established connection. In such embodiments, there may be two options on how the AMF proceeds. Either the procedure can stop at message 1904; or the SMC procedure may be initiated by the AMF and the AMF may confirm that the CID value cid_2 provided by the UE is accepted by including the CID value in the SMC message in operation 1906 that is sent back to the UE. Alternatively, the AMF may decide to allocate a new CID value (e.g., cid_3) and a fresh pair of NAS COUNT values, and use those instead. If a new CID value (different than that received from the UE) is allocated, the new CID value (e.g., cid_3) may be included in the Security Mode Command message of operation 1906.

Operation 1906. The AMF may send an SMC message including the newly allocated CID value, and the AMF may use that CID value to integrity protect the SMC message.

Operation 1907. If the Security Mode Command message includes a new CID value (e.g., cid_3), the UE checks the integrity of the SMC message using the included CID value in the SMC message, and if successful, the UE discards its own CID value (cid_2) and allocates the new CID value (cid_3) for the new NAS connection. If the initial CID value is used (e.g., the Security Mode Command message include the initial CID value cid_2 or the Security Mode Command message does not include a CID value), the UE checks the integrity of the SMC message using CID value cid_2, and the CID value cid_2 is used for the second NAS connection.

Operation 1908. The UE sends a security mode complete message with integrity and confidentiality protection using the new CID value cid_3 if the AMF selected a new CID value or using CID value cid_2 if the AMF selected use of CID value cid_2 from the UE. Here, the UE may reset the NAS UPLINK COUNT for this connection since the CID has been changed.

Based on the subsequent signaling part of the registration procedure not shown in FIG. 19, the wireless terminal UE may know if operations 1906, 1907, and 1908 are omitted and the CID value and NAS COUNT values allocated by the UE in operation 1902 still apply.

According to some other embodiments of inventive concepts, the CID may never be signaled by the wireless terminal UE, but rather, the wireless terminal UE may silently allocate and take the new CID into use and the AMF may then allocate the same value or override it by an SMC in a similar manner to the previous embodiment of FIG. 19. According to such embodiments, predetermined rules define how to allocate new CID values. Deterministic allocation of CID values may be provided as discussed above with respect to the NEXT NAS CONN ID (also referred to as a NEXT NAS CID). For example, CID values may be allocated by maintaining an additional parameter referred to as the NEXT NAS CID which is a counter initially set to 0 (after authentication). Each time there is a need to allocate a new CID value, it is taken to be the current NEXT NAS CID value and the NEXT NAS CID counter is incremented.

For this embodiment, the difference in the flow of FIG. 19 would be that the UE does not include any CID value in the registration request message of operation 1903.

In such embodiments, in operation 1903 and in case the integrity check fails after allocation of the CID value on the AMF side, it may not be clear whether the failure is due to the use of a different CID value at the UE side or something else. Therefore, it may be desirable to include the CID in the message of operation 1903 to rule out such uncertainty should the integrity check fail at operation 1904.

Operations of a wireless terminal will now be discussed with reference to the flow chart of FIG. 20A and the modules of FIG. 20B. For example, modules of FIG. 20B may be stored in wireless terminal memory 605 of FIG. 6, and these modules may provide instructions so that when the instructions of a module are executed by wireless terminal processor 603, the processor performs respective operations of the flow chart of FIG. 20A.

At block 2001, processor 603 may provide a first Non-Access Stratum NAS connection between wireless terminal UE and network node AMF through transceiver 601 and first access node AN_1 as discussed above with respect to operation 1901a of FIG. 19 (e.g., using NAS connection module 2051). Moreover, a first NAS Connection IDentification NAS CID (also referred to as a first CID) is associated with the first NAS connection.

At block 2003, processor 603 may allocate a second NAS CID for a second NAS connection between wireless terminal UE and network node AMF through second access node AN_2 while providing the first NAS connection as discussed above with respect to operation 1902 of FIG. 19 (e.g., using allocation module 2053). Moreover, the first NAS CID and the second NAS CID may be different. For example, first access node AN_1 may be a 3GPP access node (e.g., a radio access network base station) and second access node AN_2 may be a non-3GPP access node (e.g., a WiFi access node and/or a satellite access node), or first access node AN_1 may be a non-3GPP access node (e.g., a WiFi access node and/or a satellite access node) and second access node AN_2 may be a 3GPP access node (e.g., a radio access network base station).

At block 2005, processor 603 may transmit a registration request message through transceiver 601 and second access node AN_2 to network node AMF to request the second NAS connection as discussed above with respect to operation 1903 of FIG. 19 (e.g., using request transmission module 2055). Moreover, transmitting the registration request message may include performing integrity protection for the registration request message using the second NAS CID. According to some embodiments, the registration request message may include the second NAS CID. According to some other embodiments, the second NAS CID may be omitted from the registration request message, for example, if both wireless terminal UE and network node AMF are capable of deriving a same second NAS CID.

At block 2007, processor 603 may receive a security mode command message from network node AMF through second access node AN_2 and transceiver 601 as discussed above with respect to operation 1906 of FIG. 19 (e.g., using SMC reception module 2057). The security mode command message may correspond to the registration request message.

At block 2009, processor 603 may determine a NAS CID to be used for the second NAS connection (e.g., using determination module 2059), for example, based on the security mode command message. According to some embodiments, processor 603 may use the second NAS CID of operation 2003 for the second NAS connection, for example, if the security mode command message includes the second NAS CID or if the security mode command message does not include a NAS CID. According to some other embodiments, processor 603 may use a different NAS CID included in the security mode command message.

At block 2011, processor 603 may transmit a security mode complete message to network node AMF through transceiver 601 and second access node AN_2 responsive to receiving the security mode command message as discussed above with respect to operation 1908 of FIG. 19 (e.g., using SMC transmission module 2061).

If the second NAS CID is allocated by wireless terminal UE at block 2003 and determined for use for the second NAS connection at block 2009, processor 603 may perform integrity protection for the security mode command message using the second NAS CID at block 2007, and processor may perform integrity protection for the security mode complete message using the second NAS CID at block 2011. In such embodiments, the security mode command message of block 2007 may include the second NAS CID, or the security mode command message of block 2007 may omit any NAS CID for the second NAS connection. Moreover, processor 603 may perform confidentiality protection for the security mode complete message using the second NAS CID at block 2011.

If the second NAS CID is allocated by wireless terminal UE at block 2003 and determined for use for the second NAS connection at block 2009, processor 603 determine at block 2013 whether a NAS communication is to be provided using the first NAS connection or the second NAS connection (e.g., using communication decision module 2063). For a first NAS message to be communicated over the first NAS connection, at block 2015, processor 603 may communicate the first NAS message between wireless terminal UE and network node AMF over the first NAS connection through transceiver 601 and first access node AN_1 after transmitting the security mode complete message as discussed above with respect to operation 1909a of FIG. 19 (e.g., using first communication module 2065). Communicating the first NAS message may include at least one of performing integrity protection for the first NAS message using the first NAS CID and/or performing confidentiality protection for the first NAS message using the first NAS CID. For a second NAS message to be communicated over the second NAS connection, at block 2017, processor 603 may communicate the second NAS message between wireless terminal UE and network node AMF over the second NAS connection through transceiver 601 and second access node AN_2 after transmitting the security mode complete message as discussed above with respect to operation 1910a of FIG. 19 (e.g., using second communication module 2067). Communicating the second NAS message may include at least one of performing integrity protection for the second NAS message using the second NAS CID and/or performing confidentiality protection for the second NAS message using the second NAS CID. According to such embodiments, the first and second NAS connections may share a master key of a NAS security context, transmitting the registration request message at block 2005 may include performing the integrity protection for the registration request message using the second NAS CID and the master key, communicating the first NAS message at block 2015 may include at least one of performing integrity protection for the first NAS message using the first NAS CID and the master key and/or performing confidentiality protection for the first NAS message using the first NAS CID and the master key, and communicating the second NAS message at block 2017 may include at least one of performing integrity protection for the second NAS message using the second NAS CID and the master key and/or performing confidentiality protection for the second NAS message using the second NAS CID and the master key.

If the security mode command message of block 2007 includes a third NAS CID for the second NAS connection that is different from the first and second NAS CIDs, receiving the security mode command message at block 2007 may include performing integrity protection for the security mode command message using the third NAS CID, and transmitting the security mode complete message at block 2011 may include performing integrity protection for the security mode complete message using the third NAS CID. Moreover, processor 603 may perform confidentiality protection for the security mode complete message using the third NAS CID at block 2011.

If a third NAS CID is received in the security mode command message of block 2007, processor 603 may determine at block 2013 whether a communication is to be provided using the first NAS connection or the second NAS connection (e.g., using communication decision module 2063). For a first NAS message to be communicated over the first NAS connection, at block 2015, processor 603 may communicate the first NAS message between wireless terminal UE and network node AMF over the first NAS connection through transceiver 601 and first access node AN_1 as discussed above with respect to operation 1909*a* of FIG. 19 (e.g., using first communication module 2065) after transmitting the security mode complete message. Communicating the first NAS message may include at least one of performing integrity protection for the first NAS message using the first NAS CID and/or performing confidentiality protection for the first NAS message using the first NAS CID. For a second NAS message to be communicated over the second NAS connection, at block 2017, processor 603 may communicate the second NAS message between the wireless terminal UE and the network node AMF over second NAS connection through transceiver 601 and second access node AN_2 as discussed above with respect to operation 1910*a* of FIG. 19 (e.g. using second communication module 2067) after transmitting the security mode complete message. Communicating the second NAS message may include at least one of performing integrity protection for the second NAS message using the third NAS CID and/or performing confidentiality protection for the second NAS message using the third NAS CID. According to such embodiments, the first and second NAS connections may share a master key of a NAS security context, transmitting the registration request message at block 2005 may include performing the integrity protection for the registration request message using the second NAS CID and the master key, communicating the first NAS message at block 2015 may include at least one of performing integrity protection for the first NAS message using the first NAS CID and the master key and/or performing confidentiality protection for the first NAS message using the first NAS CID and the master key, and communicating the second NAS message at block 2017 may include at least one of performing integrity protection for the second NAS message using the third NAS CID and the master key and/or performing confidentiality protection for the second NAS message using the third NAS CID and the master key.

Figure 20A:
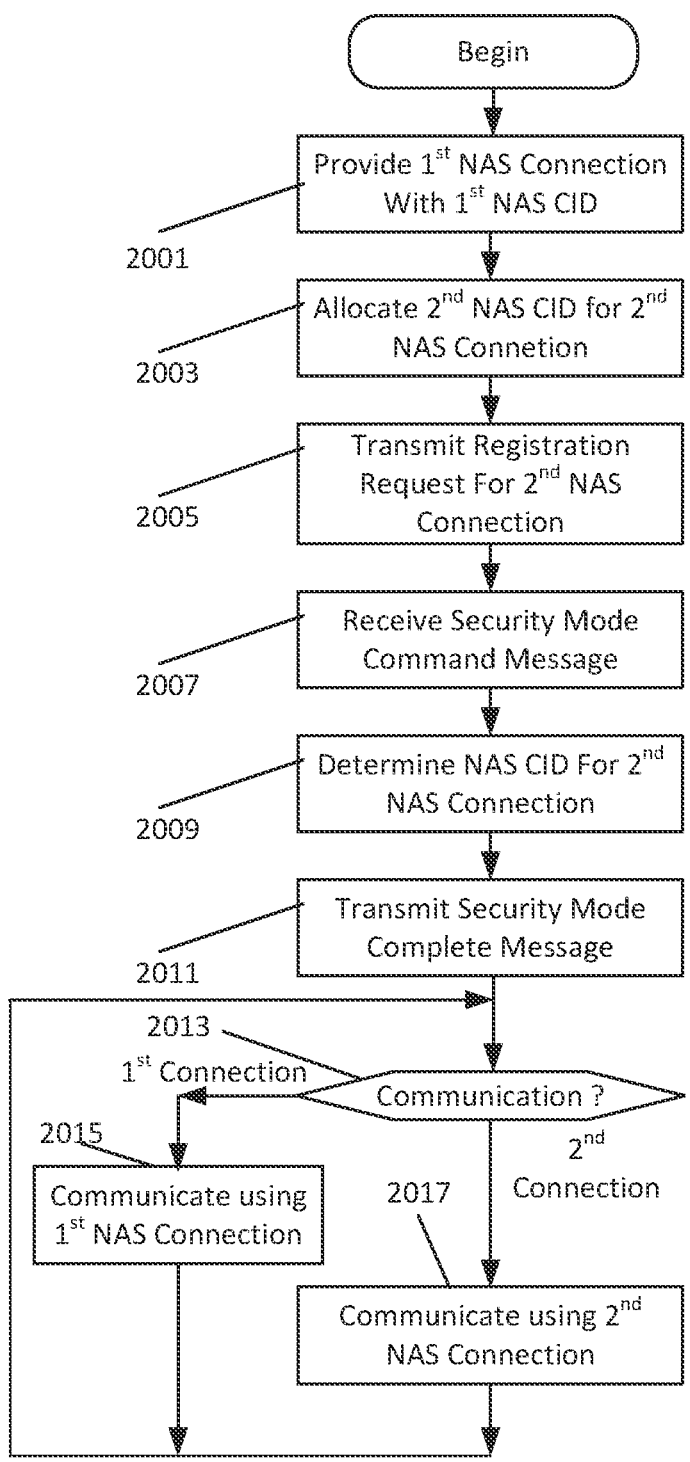
FIG. 20A is a flow chart illustrating operations of a wireless terminal according to some embodiments of inventive concepts.
Figure 20B:
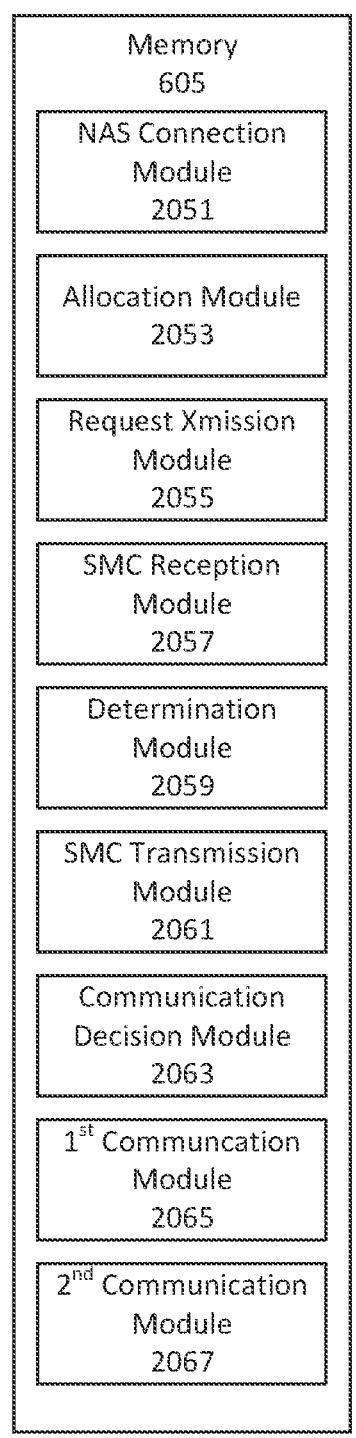
FIG. 20B is a block diagram illustrating memory modules corresponding to operations of FIG. 20A according to some embodiments of inventive concepts.

Various operations of FIG. 20A and/or modules of FIG. 20B may be optional with respect to some embodiments. Regarding some embodiments of Claim 1, for example, operations of blocks 2009, 2013, 2015, and 2017 of FIG. 20A may be optional, and/or modules 2059, 2063, 2065, and 2067 of FIG. 20B may be optional.

Operations of network node AMF will now be discussed with reference to the flow chart of FIG. 21A and the modules of FIG. 21B. For example, modules of FIG. 21B may be stored in network node memory 705 of FIG. 7, and these modules may provide instructions so that when the instructions of a module are executed by network node processor 703, the processor performs respective operations of the flow chart of FIG. 21A.

At block 2101, processor 703 may provide a first Non-Access Stratum NAS connection between network node AMF and wireless terminal UE through network interface 701 and first access node AN_1 as discussed above with respect to operation 1901*b* of FIG. 19 (e.g., using NAS connection module 2151). Moreover, the first NAS Connection IDentification, NAS CID is associated with the first NAS connection.

At block 2103, while providing the first NAS connection, processor 703 may receive a registration request message through second access node AN_2 and network interface 701 from wireless terminal UE to request a second NAS connection through second access node AN_2 as discussed above with respect to operation 1904 of FIG. 19 (e.g., using request reception module 2153). For example, first access node AN_1 may be a 3GPP access node (e.g., a radio access network base station) and second access node AN_2 may be a non-3GPP access node (e.g., a WiFi access node and/or a satellite access node), or first access node AN_1 may be a non-3GPP access node and second access node AN_2 may be a 3GPP access node (e.g., a radio access network base station).

At block 2105, processor 703 may select a second NAS CID for the second NAS connection (e.g., using NAS CID selection module 2155) responsive to receiving the registration request message as discussed above with respect to operation 1905 of FIG. 19. Processor 703 may either: select a NAS CID previously allocated by wireless terminal UE as discussed above with respect to operation 2003 (that may or may not be included in the registration request message of block 2103); or select a NAS CID different than that previously allocated by wireless terminal UE. For ease of discussion with respect to FIGS. 21A and 21B, the first NAS CID refers to the NAS CID used for the first NAS connection and the second NAS CID refers to the NAS CID used for the second NAS connection after transmitting the security mode command message. If a different NAS CID is allocated by wireless terminal UE and/or included in the registration request message (before selecting the second NAS CID at block 2105), this different NAS CID will be referred to as a third NAS CID where the term "third" does not imply an order with respect to any of the other NAS CIDs. It is further noted that the usage of the terms "second" and "third" with respect to FIGS. 21A and 21B may be different than that used with respect to FIGS. 20A and 20B.

At block 2107, processor 703 may transmit a security mode command message to wireless terminal UE through network interface 701 and second access node AN_2 as discussed above with respect to operation 1906 of FIG. 19 (e.g., using SMC transmission module 2157) responsive to receiving the registration request message. Moreover, transmitting the security mode command message may include performing integrity protection for the security mode command message using the second NAS CID, and the first NAS CID and the second NAS CID may be different. The security mode command message may include the second NAS CID, or the second NAS CID may be omitted from the security mode command message if the second NAS CID is unchanged from a NAS CID already allocated by wireless terminal UE.

At block 2111, processor 703 may receive a security mode complete message from wireless terminal UE through network interface 701 and second access node AN_2 as discussed above with respect to operation 1908 of FIG. 19 (e.g., using SMC reception module 2161). The security mode complete message may correspond to the security mode command message.

If the second NAS CID selected at block 2105 is the same as a NAS CID allocated by wireless terminal UE, receiving the registration request message at block 2103 may include performing integrity protection for the registration request message using the second NAS CID, and receiving the security mode complete message at block 2111 may include performing integrity protection for the security mode complete message using the second NAS CID. In this case, the registration request message may include the second NAS CID, or the second NAS CID message may be omitted from the registration request message (e.g., if wireless terminal UE and network node AMF are both able to derive the same second NAS CID). Moreover, receiving the security mode complete message at block 2103 may include performing confidentiality protection for the security mode complete message using the second NAS CID.

If the second NAS CID selected at block 2105 is the same as a NAS CID allocated by wireless terminal UE, processor 703 may determine at block 2113 whether a communication is to be provided using the first NAS connection or the second NAS connection (e.g., using communication decision module 2163). For a first NAS message to be communicated over the first NAS connection, at block 2115, processor 703 may communicate a first NAS message between wireless terminal UE and network node AMF over the first NAS connection through network interface and first access node AN_1 after receiving the security node complete message as discussed above with respect to operation 1909b of FIG. 19 (e.g., using first communication module 2165). Moreover, communicating the first NAS message may include at least one of performing integrity protection for the first NAS message using the first NAS CID and/or performing confidentiality protection for the first NAS message using the first NAS CID. For a second NAS message to be communicated over the second NAS connection, at block 2117, processor 703 may communicate a second NAS message between wireless terminal UE and network node AMF over the second NAS connection through network interface 701 and second access node AN_2 after receiving the security mode complete message as discussed above with respect to operation 1910b of FIG. 19 (e.g., using second communication module 2167). Moreover, communicating the second NAS message may include at least one of performing integrity protection for the second NAS message using the second NAS CID and/or performing confidentiality protection for the second NAS message using the second NAS CID. According to such embodiments, the first and second NAS connections may share a master key of a NAS security context, receiving the registration request message may include performing the integrity protection for the registration request message using the second NAS CID and the master key, communicating the first NAS message may include at least one of performing integrity protection for the first NAS message using the first NAS CID and the master key and/or performing confidentiality protection for the first NAS message using the first NAS CID and the master key, and communicating the second NAS message may include at least one of performing integrity protection for the second NAS message using the second NAS CID and the master key and/or performing confidentiality protection for the second NAS message using the second NAS CID and the master key.

If the second NAS CID selected at block 2105 is different than a NAS CID allocated by wireless terminal UE (i.e., a third NAS CID), receiving the registration request message at block 2103 may include performing integrity protection for the registration request message using the third NAS CID (allocated by wireless terminal UE), and receiving the security mode complete message at block 2111 may include performing integrity protection for the security mode complete message using the second NAS CID. As discussed above, the registration request message may include the third NAS CID, or the third NAS CID may be omitted from the registration request message if the third NAS CID can be separately derived at both of wireless terminal UE and network node AMF. Moreover, receiving the security mode complete message may include performing confidentiality protection for the security mode complete message using the second NAS CID.

If the second NAS CID selected at block 2105 is different than a third NAS CID allocated by wireless terminal UE, processor 703 may determine at block 2113 whether a communication is to be provided using the first NAS connection or the second NAS connection (e.g., using communication decision module 2163). For a first NAS message to be communicated over the first NAS connection, at block 2115, processor 703 may communicate a first NAS message between wireless terminal UE and network node AMF over the first NAS connection through network interface 701 and first access node AN_1 as discussed above with respect to operation 1909b of FIG. 19 (e.g. using first communication module 2165) after receiving the security mode complete message. Moreover, communicating the first NAS message may include at least one of performing integrity protection for the first NAS message using the first NAS CID and/or performing confidentiality protection for the first NAS message using the first NAS CID. For a second NAS message to be communicated over the second NAS connection, at block 2117, processor 703 may communicate a second NAS message between wireless terminal UE and network node AMF over the second NAS connection through network interface 701 and second access node AN_2 as discussed above with respect to operation 1910b of FIG. 19 (e.g. using second communication module 2167) after receiving the security mode complete message. Moreover, communicating the second NAS message may include at least one of performing integrity protection for the second NAS message using the second NAS CID and/or performing confidentiality protection for the second NAS message using the second NAS CID. According to such embodiments, the first and second NAS connections may share a master key of a NAS security context, receiving the registration request message may include performing the integrity protection for the registration request message using the third NAS CID and the master key, communicating the first NAS message may include at least one of performing integrity protection for the first NAS message using the first NAS CID and the master key and/or performing confidentiality protection for the first NAS message using the first NAS CID and the master key, and communicating the second NAS message may include at least one of performing integrity protection for the second NAS message using the second NAS CID and the master key and/or performing confidentiality protection for the second NAS message using the second NAS CID and the master key.

Figure 21A:
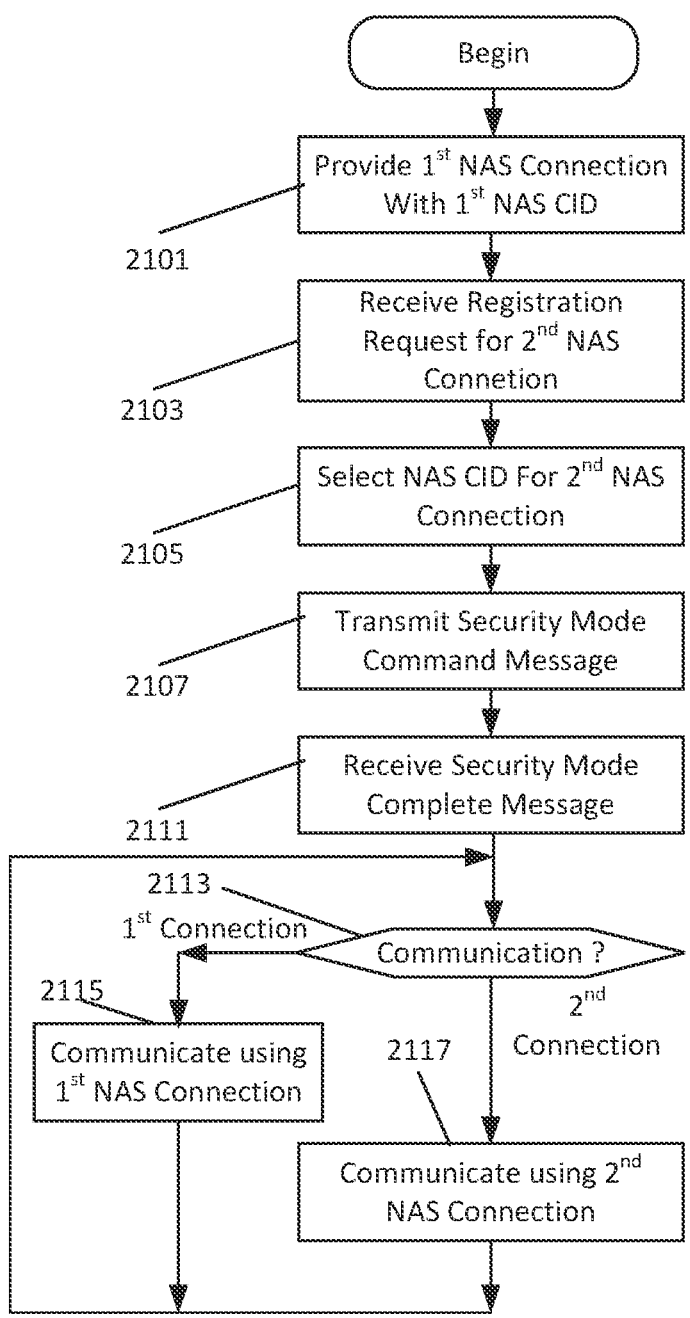
FIG. 21A is a flow chart illustrating operations of a network node according to some embodiments of inventive concepts.
Figure 21B:
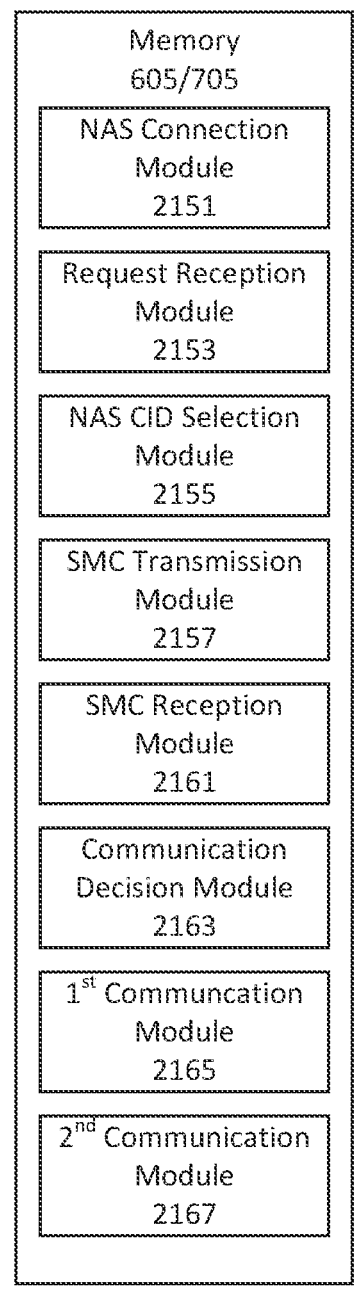
FIG. 21B is a block diagram illustrating memory modules corresponding to operations of FIG. 21A according to some embodiments of inventive concepts.

Various operations of FIG. 21A and/or modules of FIG. 21B may be optional with respect to some embodiments of communication nodes and related methods. Regarding methods of example embodiment 1 (set forth below), for example, operations of blocks 2105, 2113, 2115, and 2117 of FIG. 21A may be optional, and/or modules 2155, 2163, 2165, and 2167 of FIG. 21B may be optional.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Explanations of various abbreviations used in the present disclosure are provided below:
  AMF Access Management Function
  AN Access Network
  AUSF Authentication Server Function
  CID NAS Connection Identifier
  CM Connection Management
  EPC Evolved Packet Core
  EEA EPS Encryption Algorithm
  EIA EPS Integrity Algorithm
  eKSI Key Set Identifier in E-UTRAN
  EPS Evolved Packet System
  NAS Non-Access Stratum
  PLMN Public Land Mobile Network
  RAN Radio Access Network
  RM Registration Management
  SN Sequence number
  SMC Security Mode Command
  SUPI Subscriber Unique Permanent Identity Information is provided below regarding references mentioned herein:
[1] 3GPP TS 23.501, v1.0.0 (2017-06)
[2] 3GPP TS 33.401, v15.0.0 (2017-06)
[3] 3GPP TS 24.301, v14.4.0 (2017-06)
[4] 3GPP TS 33.220, v15.0.0 (2017-06)
[5] RFC 2104
[6] 3GPP TS 23.502, v0.4.0 (2017-05)

The invention claimed is:

1. A method at a wireless terminal to support communication with a network node of a wireless communication network, the method comprising:
  providing a first Non-Access Stratum (NAS) connection between the wireless terminal and the network node through a first access node, wherein a first NAS Connection Identification (NAS CID) and a pair of NAS COUNTS for uplink and downlink are associated with the first NAS connection;
  while providing the first NAS connection, allocating a second NAS CID for a second NAS connection between the wireless terminal and the network node through a second access node, wherein the first NAS CID and the second NAS CID are different;
  transmitting an integrity protected registration request message through the second access node to the network node to request the second NAS connection, wherein an integrity protection of the registration request message has been done using the second NAS CID;
  receiving a security mode command message from the network node through the second access node, wherein the security mode command message corresponds to the registration request message; and
  responsive to receiving the security mode command message, transmitting a security mode complete message from the wireless terminal to the network node through the second access node.

2. The method of claim 1, wherein the integrity protected registration request message includes the second NAS CID.

3. The method of claim 1, wherein receiving the security mode command message includes performing integrity protection for the security mode command message using the second NAS CID, and wherein transmitting the security mode complete message includes performing integrity protection for the security mode complete message using the second NAS CID.

4. The method of claim 3, wherein the security mode command message includes the second NAS CID.

5. The method of claim 3, wherein transmitting the security mode complete message includes performing confidentiality protection for the security mode complete message using the second NAS CID.

6. The method of claim 3 further comprising:
  after transmitting the security mode complete message, communicating a first NAS message between the wireless terminal and the network node over the first NAS connection through the first access node, wherein communicating the first NAS message includes at least one of performing integrity protection for the first NAS message using the first NAS CID and/or performing confidentiality protection for the first NAS message using the first NAS CID; and
  after transmitting the security mode complete message, communicating a second NAS message between the wireless terminal and the network node over the second NAS connection through the second access node, wherein communicating the second NAS message includes at least one of performing integrity protection for the second NAS message using the second NAS CID and/or performing confidentiality protection for the second NAS message using the second NAS CID, wherein
  the first and second NAS connections share a master key of a NAS security context,
  transmitting the integrity protected registration request message wherein an integrity protection of the registration request message has been done using the second NAS CID and the master key,
  communicating the first NAS message includes at least one of performing integrity protection for the first NAS message using the first NAS CID and the master key and/or performing confidentiality protection for the first NAS message using the first NAS CID and the master key, and
  communicating the second NAS message includes at least one of performing integrity protection for the second NAS message using the second NAS CID and the master key and/or performing confidentiality protection for the second NAS message using the second NAS CID and the master key.

7. The method of claim 1, wherein
  the security mode command message includes a third NAS CID, wherein the first NAS CID and the third NAS CID are different, wherein the second NAS CID and the third NAS CID are different, wherein receiving the security mode command message includes performing integrity protection for the security mode command message using the third NAS CID, and wherein transmitting the security mode complete message includes performing integrity protection for the security mode complete message using the third NAS CID, and transmitting the security mode complete message includes performing confidentiality protection for the security mode complete message using the third NAS CID.

8. The method of claim 7 further comprising:

after transmitting the security mode complete message, communicating a first NAS message between the wireless terminal and the network node over the first NAS connection through the first access node, wherein communicating the first NAS message includes at least one of performing integrity protection for the first NAS message using the first NAS CID and/or performing confidentiality protection for the first NAS message using the first NAS CID; and after transmitting the security mode complete message, communicating a second NAS message between the wireless terminal and the network node over the second NAS connection through the second access node, wherein communicating the second NAS message includes at least one of performing integrity protection for the second NAS message using the third NAS CID and/or performing confidentiality protection for the second NAS message using the third NAS CID, wherein the first and second NAS connections share a master key of a NAS security context, transmitting the integrity protected registration request message wherein an integrity protection of the registration request message has been done using the second NAS CID and the master key, communicating the first NAS message includes at least one of performing integrity protection for the first NAS message using the first NAS CID and the master key and/or performing confidentiality protection for the first NAS message using the first NAS CID and the master key, and communicating the second NAS message includes at least one of performing integrity protection for the second NAS message using the third NAS CID and the master key and/or performing confidentiality protection for the second NAS message using the third NAS CID and the master key.

9. The method of claim 1, wherein the first access node is a 3GPP access node, wherein the second access node is a non-3GPP access node, or wherein the first access node is a non-3GPP access node and the second access node is a 3GPP access node, the 3GPP access node comprises a radio access network base station, and the non-3GPP access node comprises at least one of a WiFi access node and/or a satellite access node.

10. A method at a network node of a wireless communication network providing communication of Non-Access Stratum (NAS) messages with a wireless terminal, the method comprising:

providing a first (NAS) connection between the network node and the wireless terminal through a first access node, wherein a first NAS Connection Identification (NAS CID) and a pair of NAS COUNTS for uplink and downlink is associated with the first NAS connection;

while providing the first NAS connection, receiving an integrity protected registration request message through a second access node from the wireless terminal to request a second NAS connection through the second access node, wherein an integrity protection of the registration request message has been done using the second NAS CID;

responsive to receiving the integrity protected registration request message, transmitting a security mode command message to the wireless terminal through the second access node, wherein transmitting the security mode command message includes performing integrity protection for the security mode command message using a second NAS CID, and wherein the first NAS CID and the second NAS CID are different; and receiving a security mode complete message from the wireless terminal through the second access node, wherein the security mode complete message corresponds to the security mode command message.

11. The method of claim 10, wherein the security mode command message includes the second NAS CID.

12. The method of claim 10, wherein receiving the integrity protected registration request message wherein an integrity protection of the registration request message has been done using the second NAS CID, and wherein receiving the security mode complete message includes performing integrity protection for the security mode complete message using the second NAS CID.

13. The method of claim 12, wherein receiving the security mode complete message includes performing confidentiality protection for the security mode complete message using the second NAS CID.

14. The method of claim 12 further comprising:

after receiving the security mode complete message, communicating a first NAS message between the wireless terminal and the network node over the first NAS connection through the first access node, wherein communicating the first NAS message includes at least one of performing integrity protection for the first NAS message using the first NAS CID and/or performing confidentiality protection for the first NAS message using the first NAS CID; and after receiving the security mode complete message, communicating a second NAS message between the wireless terminal and the network node over the second NAS connection through the second access node, wherein communicating the second NAS message includes at least one of performing integrity protection for the second NAS message using the second NAS CID and/or performing confidentiality protection for the second NAS message using the second NAS CID, wherein the first and second NAS connections share a master key of a NAS security context, receiving the integrity protected registration request message wherein an integrity protection of the registration request message has been done using the second NAS CID and the master key, communicating the first NAS message includes at least one of performing integrity protection for the first NAS message using the first NAS CID and the master key and/or performing confidentiality protection for the first NAS message using the first NAS CID and the master key, and communicating the second NAS message includes at least one of performing integrity protection for the second NAS message using the second NAS CID and the master key and/or performing confidentiality protection for the second NAS message using the second NAS CID and the master key.

15. The method of claim 10, wherein
receiving the integrity protected registration request message wherein an integrity protection of the registration request message has been done using a third NAS CID,
receiving the security mode complete message includes performing integrity protection for the security mode complete message using the second NAS CID,
the first NAS CID and the third NAS CID are different,
the second NAS CID and the third NAS CID are different, and
the integrity protected registration request message includes the third NAS CID.

16. The method of claim 15, wherein receiving the security mode complete message includes performing confidentiality protection for the security mode complete message using the second NAS CID.

17. The method of claim 15, further comprising:
after receiving the security mode complete message, communicating a first NAS message between the wireless terminal and the network node over the first NAS connection through the first access node, wherein communicating the first NAS message includes at least one of performing integrity protection for the first NAS message using the first NAS CID and/or performing confidentiality protection for the first NAS message using the first NAS CID; and
after receiving the security mode complete message, communicating a second NAS message between the wireless terminal and the network node over the second NAS connection through the second access node, wherein communicating the second NAS message includes at least one of performing integrity protection for the second NAS message using the second NAS CID and/or performing confidentiality protection for the second NAS message using the second NAS CID, wherein
the first and second NAS connections share a master key of a NAS security context,
receiving the integrity protected registration request message wherein an integrity protection of the registration request message has been done using the third NAS CID and the master key,
communicating the first NAS message includes at least one of performing integrity protection for the first NAS message using the first NAS CID and the master key and/or performing confidentiality protection for the first NAS message using the first NAS CID and the master key, and
communicating the second NAS message includes at least one of performing integrity protection for the second NAS message using the second NAS CID and the master key and/or performing confidentiality protection for the second NAS message using the second NAS CID and the master key.

18. The method of claim 10, wherein the first access node is a 3GPP access node and the second access node is a non-3GPP access node, or wherein the first access node is a non-3GPP access node and the second access node is a 3GPP access node.

19. A wireless terminal that supports communication with a network node of a wireless communication network, the wireless terminal comprising:
a transceiver configured to provide wireless communication over a radio interface; and
a processor coupled to the transceiver, wherein the processor is configured to,
provide a first Non-Access Stratum (NAS) connection between the wireless terminal and the network node through a first access node, wherein a first NAS Connection Identification (NAS CID) and a pair of NAS COUNTS for uplink and downlink are associated with the first NAS connection;
allocate a second NAS CID for a second NAS connection between the wireless terminal and the network node through a second access node while providing the first NAS connection, wherein the first NAS CID and the second NAS CID are different;
transmit an integrity protected registration request message through the second access node to the network node to request the second NAS connection, wherein an integrity protection of the registration request message has been done using the second NAS CID;
receive a security mode command message from the network node through the second access node, wherein the security mode command message corresponds to the registration request message; and
transmit a security mode complete message from the wireless terminal to the network node through the second access node responsive to receiving the security mode command message.

20. A network node of a wireless communication network that provides communication of Non-Access Stratum (NAS) messages with a wireless terminal, the network node comprising:
a network interface configured to provide network communication with other nodes of the wireless communication network; and
a processor coupled to the network interface, wherein the processor is configured to,
provide a first (NAS) connection between the network node and the wireless terminal through a first access node, wherein a first NAS Connection Identification (NAS CID) and a pair of NAS COUNTS for uplink and downlink are associated with the first NAS connection;
receive an integrity protected registration request message through a second access node from the wireless terminal to request a second NAS connection through the second access node while providing the first NAS connection, wherein an integrity protection of the registration request message has been done using the second NAS CID;
transmit a security mode command message to the wireless terminal through the second access node responsive to receiving the registration request message, wherein transmitting the security mode command message includes performing integrity protection for the security mode command message using a second NAS CID, and wherein the first NAS CID and the second NAS CID are different; and
receive a security mode complete message from the wireless terminal through the second access node, wherein the security mode complete message corresponds to the security mode command message.

* * * * *